US012066204B2

(12) United States Patent
Zimmerman et al.

(10) Patent No.: US 12,066,204 B2
(45) Date of Patent: Aug. 20, 2024

(54) THERMOSTAT WITH ENERGY MODELING

(71) Applicant: Johnson Controls Technology Company, Auburn Hills, MI (US)

(72) Inventors: Nathan M. Zimmerman, Wauwatosa, WI (US); Michael J. Ajax, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 16 days.

(21) Appl. No.: 17/140,957

(22) Filed: Jan. 4, 2021

(65) Prior Publication Data

US 2021/0123626 A1    Apr. 29, 2021

Related U.S. Application Data

(63) Continuation of application No. 16/146,659, filed on Sep. 28, 2018, now abandoned.

(Continued)

(51) Int. Cl.
*F24F 11/46* (2018.01)
*F24F 11/58* (2018.01)
(Continued)

(52) U.S. Cl.
CPC .............. *F24F 11/46* (2018.01); *F24F 11/58* (2018.01); *F24F 11/61* (2018.01); *F24F 11/64* (2018.01);
(Continued)

(58) Field of Classification Search
None
See application file for complete search history.

(56) References Cited

U.S. PATENT DOCUMENTS 9,251,472 B1 *  2/2016  Linowes .................. F24F 11/49
9,447,985 B2    9/2016  Johnson
(Continued)

FOREIGN PATENT DOCUMENTS

CA    2957726 A1    3/2016
CA    3043996 A1    2/2018
(Continued)

OTHER PUBLICATIONS

Lloyd, C. (Aug. 19, 2016). How to View Your Ecobee Thermostat's Usage History. howtogeek. https://www.howtogeek.com/263460/how-to-view-your-ecobee3-thermostats-usage-history/ (Year: 2016).*

(Continued)

*Primary Examiner* — Kenneth M Lo
*Assistant Examiner* — Istiaque Ahmed
(74) *Attorney, Agent, or Firm* — Foley & Lardner LLP

(57) ABSTRACT

A thermostat for a building space can include a processing circuit. The processing circuit can cause building equipment to heat or cool the building space via one or more heating outputs or one or more cooling outputs. The processing circuit can record the length of time that the processing circuit causes the building equipment to heat or cool the building space. The processing circuit can simulate a thermal plant model to determine a simulated runtime, wherein the thermal plant model is a thermal plant model of the building space and the building equipment. The processing circuit can determine a number of hours saved based on the simulated runtime and the recorded length of time.

20 Claims, 20 Drawing Sheets

Related U.S. Application Data

(60) Provisional application No. 62/595,757, filed on Dec. 7, 2017.

(51) Int. Cl.

| | | |
|---|---|---|
| *F24F 11/61* | (2018.01) | |
| *F24F 11/64* | (2018.01) | |
| *F24F 11/65* | (2018.01) | |
| *G05B 13/04* | (2006.01) | |
| *G05B 15/02* | (2006.01) | |
| *G05B 17/02* | (2006.01) | |
| *G05D 23/19* | (2006.01) | |
| *F24F 110/10* | (2018.01) | |
| *F24F 110/12* | (2018.01) | |
| *F24F 140/50* | (2018.01) | |
| *F24F 140/60* | (2018.01) | |

(52) U.S. Cl.
CPC ............ *F24F 11/65* (2018.01); *G05B 13/041* (2013.01); *G05B 15/02* (2013.01); *G05B 17/02* (2013.01); *G05D 23/1951* (2013.01); *F24F 2110/10* (2018.01); *F24F 2110/12* (2018.01); *F24F 2140/50* (2018.01); *F24F 2140/60* (2018.01); *G05B 2219/2642* (2013.01)

(56) References Cited

U.S. PATENT DOCUMENTS

| | | | |
|---|---|---|---|
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 11,156,978 B2 | 10/2021 | Johnson et al. | |
| 2009/0204267 A1 | 8/2009 | Sustaeta et al. | |
| 2010/0027603 A1 | 2/2010 | Beadle et al. | |
| 2011/0106328 A1 | 5/2011 | Zhou et al. | |
| 2011/0167025 A1 | 7/2011 | Danai et al. | |
| 2011/0231320 A1 | 9/2011 | Irving | |
| 2012/0016524 A1 | 1/2012 | Spicer et al. | |
| 2012/0253527 A1 | 10/2012 | Hietala et al. | |
| 2012/0259469 A1 | 10/2012 | Ward et al. | |
| 2012/0273581 A1 | 11/2012 | Kolk et al. | |
| 2013/0013122 A1 | 1/2013 | Dyess et al. | |
| 2013/0018513 A1 | 1/2013 | Metselaar | |
| 2013/0184880 A1* | 7/2013 | McMahon | H01R 13/4534 700/286 |
| 2013/0238144 A1 | 9/2013 | Shahapurkar et al. | |
| 2013/0274928 A1* | 10/2013 | Matsuoka | G06F 30/20 700/276 |
| 2013/0338837 A1 | 12/2013 | Hublou et al. | |
| 2014/0222219 A1 | 8/2014 | Wen | |
| 2014/0277769 A1 | 9/2014 | Matsuoka et al. | |
| 2014/0277795 A1* | 9/2014 | Matsuoka | G06F 16/955 700/291 |
| 2014/0303789 A1 | 10/2014 | Wroblewski et al. | |
| 2015/0167999 A1* | 6/2015 | Seem | F24F 11/64 700/276 |
| 2015/0248118 A1 | 9/2015 | Li et al. | |
| 2016/0041541 A1 | 2/2016 | Drees et al. | |
| 2016/0054018 A1* | 2/2016 | Motodani | F24F 11/62 700/276 |
| 2016/0079633 A1* | 3/2016 | Wahlstrom | H01M 10/625 429/82 |
| 2016/0091904 A1 | 3/2016 | Horesh et al. | |
| 2016/0098022 A1 | 4/2016 | Wenzel et al. | |
| 2016/0201933 A1 | 7/2016 | Hester et al. | |
| 2016/0290672 A1 | 10/2016 | Arensmeier | |
| 2016/0327300 A1 | 11/2016 | Ribbich et al. | |
| 2016/0377309 A1 | 12/2016 | Abiprojo et al. | |
| 2017/0089601 A1 | 3/2017 | Patil et al. | |
| 2017/0198931 A9 | 7/2017 | Svendsen | |
| 2017/0234557 A1 | 8/2017 | Notaro et al. | |
| 2017/0268797 A1 | 9/2017 | Mowris et al. | |
| 2017/0288401 A1 | 10/2017 | Hummon et al. | |
| 2017/0322579 A1 | 11/2017 | Goparaju et al. | |
| 2018/0068034 A1 | 3/2018 | Zeifman et al. | |
| 2018/0123821 A1 | 5/2018 | Alberth, Jr. | |
| 2018/0187913 A1 | 7/2018 | Kolk | |
| 2019/0017721 A1 | 1/2019 | Motodani et al. | |
| 2019/0034560 A1* | 1/2019 | Kogo | F24F 11/72 |
| 2021/0389007 A1* | 12/2021 | Chan | F24F 11/30 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

International Search Report and Written Opinion on PCT/US2018/063896, dated Apr. 30, 2019, 15 pages.

Thibodeaux, "Nest E Hands-On Review: Features, Comparisons, and Installation" H.A. Report, Url: https://homealarmreport.com/nest-e-review/, Oct. 9, 2017, 12 pages.

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

(56) References Cited

OTHER PUBLICATIONS

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

2300

How do you calculate my energy savings? ✕

We take the daily usage of a standard non-smart thermostat that you are probably familiar with and subtract the usage of your current smart thermostat. It's that simple!

Standard thermostat runtime

− Your thermostat runtime

―――――――――――――――――――

Your energy savings (hrs)

Here is how you can save more! ✕

Energy Savings Tip 1: Update your schedule! Smart scheduling allows GLAS to reduce equipment runtime without sacrificing your comfort.

Energy Savings Tip 2: Update your setpoint! Turning your cooling setpoint up and your heating setpoint down can result in reduced equipment runtime and energy savings.

THERMOSTAT WITH ENERGY MODELING

CROSS-REFERENCE TO RELATED APPLICATIONS

This application is a continuation of U.S. patent application Ser. No. 16/146,659, filed Sep. 28, 2018, which claims the benefit of and priority to U.S. Patent Application No. 62/595,757, filed Dec. 7, 2017, all of which are hereby incorporated herein by reference in their entireties.

BACKGROUND

A thermostat, in general, is a component of an HVAC control system. Thermostats sense the temperature or other parameters (e.g., humidity) of a system and control components of the HVAC system in order to maintain a set point for the temperature or other parameter. A thermostat may be designed to control a heating or cooling system or an air conditioner. Thermostats use a variety of sensors to measure temperature and other desired parameters of a system.

SUMMARY

One embodiment includes a method for determining energy savings of a thermostat. The method can include obtaining, by one or more processing circuits of the thermostat, first data indicating an actual length of time that building equipment operated to heat or cool a building space associated with the thermostat; identifying, by the one or more processing circuits of the thermostat, a thermal model representative of the building space and the building equipment; detecting, by the one or more processing circuits of the thermostat, occupancy in the building space, wherein the thermostat is configured to automatically transition the building equipment to a low energy mode when no users are detected in the building space; generating, by the one or more processing circuits of the thermostat and based on the thermal model and the occupancy of the building space, an estimated amount of time that the building equipment would operate to heat or cool the building space at a particular setpoint value, and displaying, via a user interface, a graph indicating one or more time periods where occupancy was detected in the building space, and indicating an amount of time saved by automatically transitioning the equipment to the low energy mode, wherein the amount of time saved is determined based on the difference between the actual length of time that the building equipment operated and the estimated amount of time.

Another embodiment includes a thermostat for a building space. The thermostat can include a processing circuit. The processing circuit can obtain first data indicating an actual length of time that building equipment is operated to heat or cool a building space associated with the thermostat; identify a thermal plant model representative of the building space and the building equipment; detect occupancy in the building space, wherein the thermostat is configured to automatically transition the building equipment to a low energy mode when the building space occupancy is below a threshold; generate, based on the thermal plant model and the occupancy of the building space, an estimated amount of time that the building equipment would operate to heat or cool the building space at a particular setpoint value; and display, via a user interface, a graph indicating one or more time periods where occupancy was detected in the building space, and indicating an amount of time saved by automatically transitioning the equipment to the low energy mode, wherein the amount of time saved is determined based on the difference between the actual length of time that the building equipment operated and the estimated amount of time.

Yet another embodiment includes a system for determining energy usage of a thermostat for a building space. The thermostat includes a processing circuit. The processing circuit can cause building equipment to operate to heat or cool the building space via one or more heating outputs or one or more cooling outputs, wherein an amount of time that the building equipment operates is recorded by the thermostat; detect, while the building equipment is operating, occupancy in the building space, wherein the thermostat is configured to automatically transition the building equipment to a low energy mode in response to the occupancy; generate a simulated runtime for the building equipment based on a thermal plant model, the simulated runtime indicate an estimate amount of time that the building equipment would operate to heat or cool the building space according to a setpoint, wherein the thermal plant model is a thermal model of the building space and the building equipment; and display, via a user interface, a graph indicating one or more time periods where occupancy was detected in the building space, and indicating an amount of time saved by automatically transitioning the equipment to the low energy mode, wherein the amount of time saved is determined based on the difference between the recorded length of time that the building equipment is operated and the simulated runtime.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 8-28 are drawings of user interfaces that indicate energy savings, energy savings notifications, and energy savings tips, according to various exemplary embodiments.

DETAILED DESCRIPTION

Overview

Figure 1A:
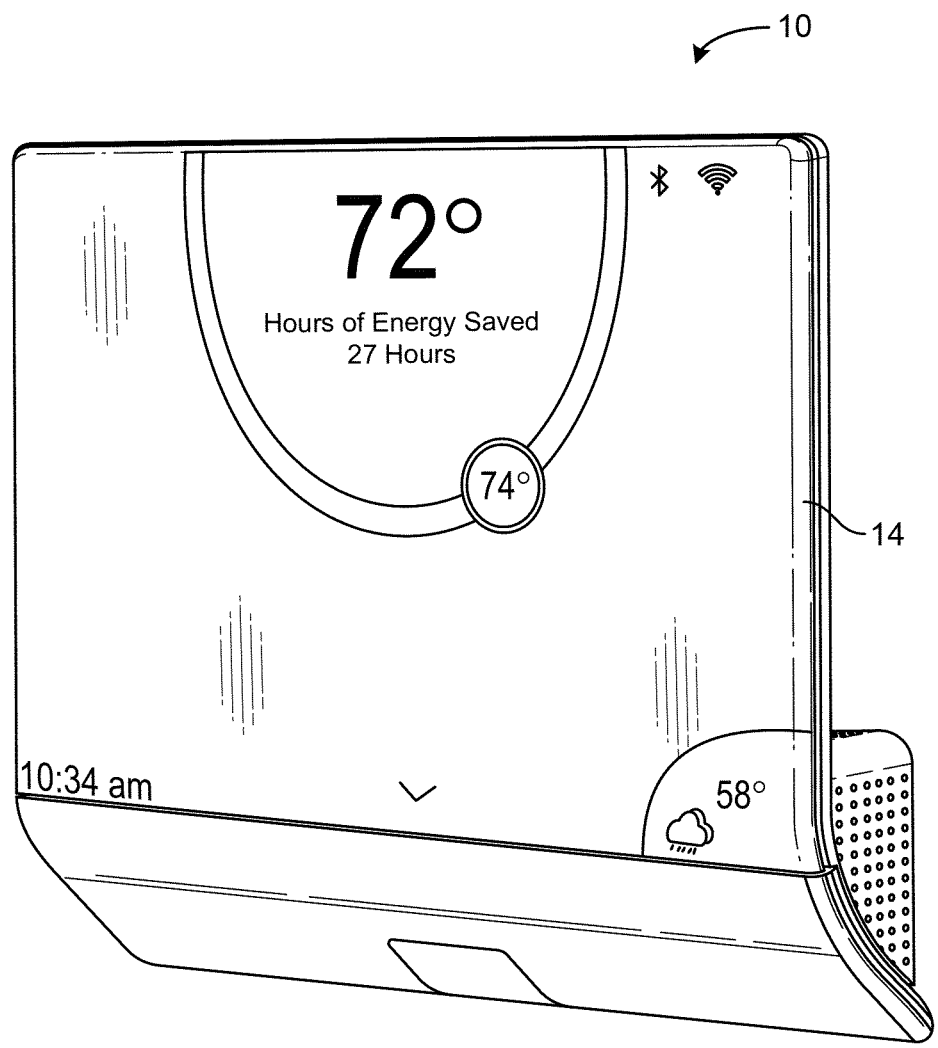
FIG. 1A is a drawing of a thermostat with a transparent cantilevered display, according to an exemplary embodiment.

Referring generally to the FIGURES, systems and methods for determining hours of energy saved for a thermostat with an energy model is shown, according to various exemplary embodiments. The energy model described herein can be used to calculate the energy savings that a thermostat achieves during its operation. The actual operation of the thermostat can be compared to the operation determined with the energy model, a "typical" operation. The typical operation may be an indication of a runtime achieved where a thermostat would continuously control heating and/or cooling with a fixed setpoint (e.g., 72 degrees Fahrenheit). The simulated typical operation may be determined by operating against a thermal model that is identified for a user's home and/or operational environment. The thermal model can be created by the thermostat or any other device to account for HVAC energy expenditure of a building for a multitude of factors. These factors include the insulation efficiency of the building, the capacity of the HVAC equipment, the outdoor temperature, and internal temperature disturbances.

Energy savings of the thermostat can be achieved by operating the thermostat with auto-away and various scheduling features that avoid operating a user's HVAC system unnecessarily. The output of the energy model can be hours of equipment runtime saved which illustrates the effect of the energy savings features of the thermostat. It may be difficult to convert hours of equipment runtime saved into dollars saved since the HVAC equipment capacity may be unknown and the cost of energy per a user's location may also be unknown. These factors vary widely per user and per location. For this reason, hours of energy saved can be used to inform a user of the saved energy.

As described herein, systems and methods by which hours of energy saved can be displayed to a user in a daily or weekly view in comparison to a thermostat operating at fixed setpoint (e.g., a 72 degrees Fahrenheit setpoint) in their environment (e.g., building, home, office, etc.). The systems and methods described herein can be used to mathematically model (e.g., generate a thermal model) a home, building, and/or HVAC equipment such that the baseline comparison between actual operation and normal operation can be performed.

Hours of energy saved may be based directly on an identified mathematical model of a user's environment and consequently can be far more accurate than statistical methods. This mathematical thermal model can evolve over time, can reject data on bad days (e.g., where equipment is always off/on), can handle multiple equipment stages, and can be stored statically. Furthermore, the determination of the thermal model can be performed efficiently such that it can be done all on a user's device (e.g., on the thermostat itself, on a mobile phone, etc.) and may not require cloud computation. However, in various embodiments, the determination of the thermal model can be performed on a remote server or other cloud computation service. The thermal dynamics model of a user's environment can take into account the outdoor air temperature as well as random temperature disturbances is mathematically complex.

FIG. 1A is a drawing of a thermostat 10 that includes a transparent cantilevered user interface 14. The user interface 14 may be an interactive display that can display information to a user and receive input from the user. The user interface 14 may be transparent such that a user can view information on the display and view the surface (e.g., a wall) located behind the display. The thermostat 10 can be configured to determine hours of energy saved which may indicate a reduction in runtime of the equipment of a home or building of a user. The thermostat 10 can present the hours of energy saved via single number and/or via multiple graphs. Examples of displaying energy savings to a user is shown in FIGS. 7-27. Thermostats with transparent and cantilevered user interfaces are described in further detail in U.S. patent application Ser. No. 15/146,649 filed May 4, 2016, the entirety of which is incorporated by reference herein.

The user interface 14 can be a touchscreen or other type of electronic display configured to present information to a user in a visual format (e.g., as text, graphics, etc.) and receive input from a user (e.g., via a touch-sensitive panel). For example, the user interface 14 may include a touch-sensitive panel layered on top of an electronic visual display. A user can provide inputs through simple or multi-touch gestures by touching the user interface 14 with one or more fingers and/or with a stylus or pen. The user interface 14 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 14 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the user interface 14 is configured to present visual media (e.g., text, graphics, etc.) without requiring a backlight.

Figure 1B:
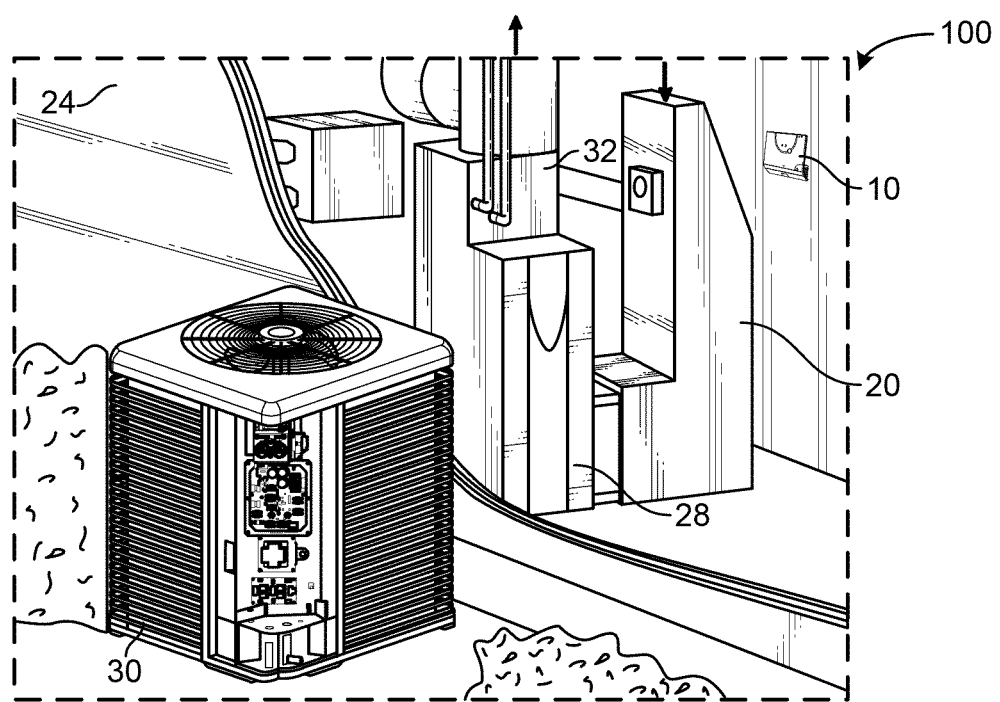
FIG. 1B is a schematic drawing of a building equipped with a residential heating and cooling system and a thermostat, according to an exemplary embodiment.

FIG. 1B illustrates a residential heating and cooling system 100, such as an HVAC system. The residential heating and cooling system 100 may provide heated and cooled air to a residential structure. Although described as a residential heating and cooling system 100, embodiments of the systems and methods described herein can be utilized in a cooling unit or a heating unit in a variety of applications include commercial HVAC units (e.g., roof top units). In general, a residence 24 includes refrigerant conduits that operatively couple an indoor unit 28 to an outdoor unit 30. Indoor unit 28 may be positioned in a utility space, an attic, a basement, and so forth. Outdoor unit 30 is situated adjacent to a side of residence 24. Refrigerant conduits transfer refrigerant between indoor unit 28 and outdoor unit 30, typically transferring primarily liquid refrigerant in one direction and primarily vaporized refrigerant in an opposite direction.

When the system 100 shown in FIG. 1B is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit 28, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan, and expels the air. When operating as an air conditioner, the air is heated by the condenser coil within the outdoor unit 30 and exits the top of the unit at a temperature higher than it entered the sides. Air is blown over indoor coil 32 and is then circulated through residence 24 by means of ductwork 20, as indicated by the arrows entering and exiting ductwork 20. The overall system 100 operates to maintain a desired temperature as set by thermostat 10. When the temperature sensed inside the residence 24 is higher than the set point on the thermostat 10 (with the addition of a relatively small tolerance), the air conditioner will become operative to refrigerate additional air for circulation through the residence 24. When the temperature reaches the set point (with the removal of a relatively small tolerance), the unit can stop the refrigeration cycle temporarily.

In some embodiments, the system 100 is configured so that the outdoor unit 30 is controlled to achieve a more elegant control over temperature and humidity within the residence 24. The outdoor unit 30 is controlled to operate components within the outdoor unit 30, and the system 100, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 2:
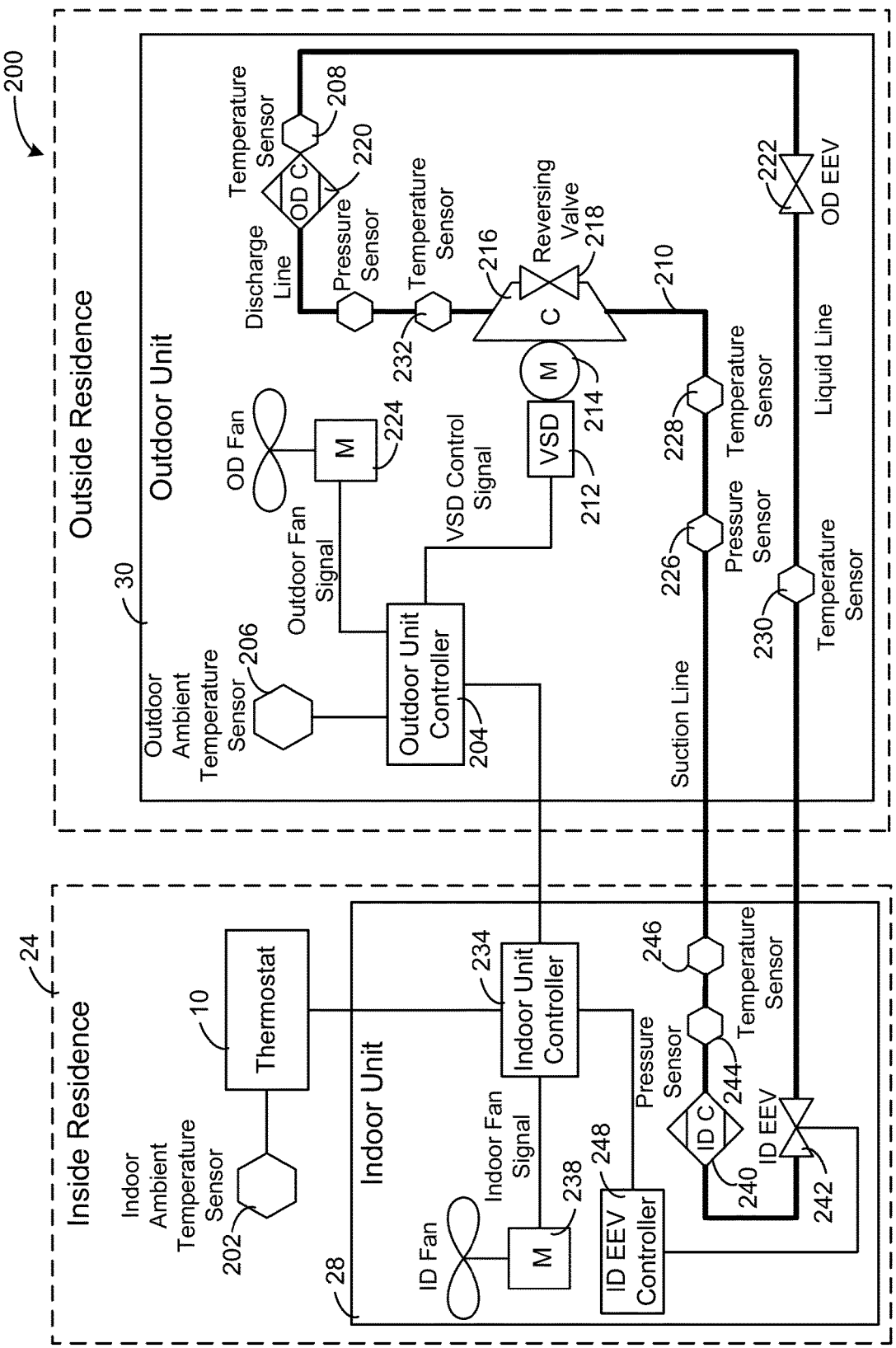
FIG. 2 is a schematic drawing of the thermostat and the residential heating and cooling system of FIG. 1, according to an exemplary embodiment.

Referring now to FIG. 2, an HVAC system 200 is shown according to an exemplary embodiment. Various components of system 300 are located inside residence 24 while other components are located outside residence 24. Outdoor unit 30, as described with reference to FIG. 1, is shown to be located outside residence 24 while indoor unit 28 and thermostat 10, as described with reference to FIG. 1, are shown to be located inside the building. In various embodiments, the thermostat 10 can cause the indoor unit 28 and the outdoor unit 30 to heat residence 24. In some embodiments, the thermostat 10 can cause the indoor unit 28 and the outdoor unit 30 to cool the residence 24. In other embodiments, the thermostat 10 can command an airflow change within the residence 24 to adjust the humidity within the residence 24.

Thermostat 10 can be configured to generate control signals for indoor unit 28 and/or outdoor unit 30. The thermostat 10 is shown to be connected to an indoor ambient temperature sensor 202, and an outdoor unit controller 204 is shown to be connected to an outdoor ambient temperature sensor 206. The indoor ambient temperature sensor 202 and the outdoor ambient temperature sensor 206 may be any kind of temperature sensor (e.g., thermistor, thermocouple, etc.). The thermostat 10 may measure the temperature of residence 24 via the indoor ambient temperature sensor 202. Further, the thermostat 10 can be configured to receive the temperature outside residence 24 via communication with the outdoor unit controller 204. In various embodiments, the thermostat 10 generates control signals for the indoor unit 28 and the outdoor unit 30 based on the indoor ambient temperature (e.g., measured via indoor ambient temperature sensor 202), the outdoor temperature (e.g., measured via the outdoor ambient temperature sensor 206), and/or a temperature set point.

The indoor unit 28 and the outdoor unit 30 may be electrically connected. Further, indoor unit 28 and outdoor unit 30 may be coupled via conduits 210. The outdoor unit 30 can be configured to compress refrigerant inside conduits 210 to either heat or cool the building based on the operating mode of the indoor unit 28 and the outdoor unit 30 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 30 is shown to include the outdoor unit controller 204, a variable speed drive 212, a motor 214 and a compressor 216. The outdoor unit 30 can be configured to control the compressor 216 and to further cause the compressor 216 to compress the refrigerant inside conduits 210. In this regard, the compressor 216 may be driven by the variable speed drive 212 and the motor 214. For example, the outdoor unit controller 204 can generate control signals for the variable speed drive 212. The variable speed drive 212 (e.g., an inverter, a variable frequency drive, etc.) may be an AC-AC inverter, a DC-AC inverter, and/or any other type of inverter. The variable speed drive 212 can be configured to vary the torque and/or speed of the motor 214 which in turn drives the speed and/or torque of compressor 216. The compressor 216 may be any suitable compressor such as a screw compressor, a reciprocating compressor, a rotary compressor, a swing link compressor, a scroll compressor, or a turbine compressor, etc.

In some embodiments, the outdoor unit controller 204 is configured to process data received from the thermostat 10 to determine operating values for components of the system 100, such as the compressor 216. In one embodiment, the outdoor unit controller 204 is configured to provide the determined operating values for the compressor 216 to the variable speed drive 212, which controls a speed of the compressor 216. The outdoor unit controller 204 is controlled to operate components within the outdoor unit 30, and the indoor unit 28, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 204 can control a reversing valve 218 to operate system 200 as a heat pump or an air conditioner. For example, the outdoor unit controller 204 may cause reversing valve 218 to direct compressed refrigerant to the indoor coil 32 while in heat pump mode and to an outdoor coil 220 while in air conditioner mode. In this regard, the indoor coil 32 and the outdoor coil 220 can both act as condensers and evaporators depending on the operating mode (i.e., heat pump or air conditioner) of system 200.

Further, in various embodiments, outdoor unit controller 204 can be configured to control and/or receive data from an outdoor electronic expansion valve (EEV) 222. The outdoor electronic expansion valve 222 may be an expansion valve controlled by a stepper motor. In this regard, the outdoor unit controller 204 can be configured to generate a step signal (e.g., a PWM signal) for the outdoor electronic expansion valve 222. Based on the step signal, the outdoor electronic expansion valve 222 can be held fully open, fully closed, partial open, etc. In various embodiments, the outdoor unit controller 204 can be configured to generate step signal for the outdoor electronic expansion valve 222 based on a subcool and/or superheat value calculated from various temperatures and pressures measured in system 200. In one embodiment, the outdoor unit controller 204 is configured to control the position of the outdoor electronic expansion valve 222 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 204 can be configured to control and/or power outdoor fan 224. The outdoor fan 224 can be configured to blow air over the outdoor coil 220. In this regard, the outdoor unit controller 204 can control the amount of air blowing over the outdoor coil 220 by generating control signals to control the speed and/or torque of outdoor fan 224. In some embodiments, the control signals are pulse wave modulated signals (PWM), analog voltage signals (i.e., varying the amplitude of a DC or AC signal), and/or any other type of signal. In one embodiment, the outdoor unit controller 204 can control an operating value of the outdoor fan 224, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 30 may include one or more temperature sensors and one or more pressure sensors. The temperature sensors and pressure sensors may be electrical connected (i.e., via wires, via wireless communication, etc.) to the outdoor unit controller 204. In this regard, the outdoor unit controller 204 can be configured to measure and store the temperatures and pressures of the refrigerant at various locations of the conduits 210. The pressure sensors may be any kind of transducer that can be configured to sense the pressure of the refrigerant in the conduits 210. The outdoor unit 30 is shown to include pressure sensor 226. The pressure sensor 226 may measure the pressure of the refrigerant in conduit 210 in the suction line (i.e., a predefined distance from the inlet of compressor 216. Further, the outdoor unit 30 is shown to include pressure sensor 226. The pressure sensor 226 may be configured to measure the pressure of the refrigerant in conduits 210 on the discharge line (e.g., a predefined distance from the outlet of compressor 216).

The temperature sensors of outdoor unit 30 may include thermistors, thermocouples, and/or any other temperature sensing device. The outdoor unit 30 is shown to include temperature sensor 208, temperature sensor 228, temperature sensor 230, and temperature sensor 232. The temperature sensors (i.e., temperature sensor 208, temperature sensor 228, temperature sensor 230, and/or temperature sensor 232) can be configured to measure the temperature of the refrigerant at various locations inside conduits 210.

Referring now to the indoor unit 28, the indoor unit 28 is shown to include indoor unit controller 234, indoor electronic expansion valve controller 236, an indoor fan 238, an indoor coil 240, an indoor electronic expansion valve 242, a pressure sensor 244, and a temperature sensor 246. The indoor unit controller 234 can be configured to generate control signals for indoor electronic expansion valve controller 248. The signals may be set points (e.g., temperature set point, pressure set point, superheat set point, subcool set point, step value set point, etc.). In this regard, indoor electronic expansion valve controller 248 can be configured to generate control signals for indoor electronic expansion valve 242. In various embodiments, indoor electronic expansion valve 242 may be the same type of valve as outdoor electronic expansion valve 222. In this regard, indoor electronic expansion valve controller 248 can be configured to generate a step control signal (e.g., a PWM wave) for controlling the stepper motor of the indoor electronic expansion valve 242. In this regard, indoor electronic expansion valve controller 248 can be configured to fully open, fully close, or partially close the indoor electronic expansion valve 242 based on the step signal.

Indoor unit controller 234 can be configured to control indoor fan 238. The indoor fan 238 can be configured to blow air over indoor coil 32. In this regard, the indoor unit controller 234 can control the amount of air blowing over the indoor coil 240 by generating control signals to control the speed and/or torque of the indoor fan 238. In some embodiments, the control signals are pulse wave modulated signals (PWM), analog voltage signals (i.e., varying the amplitude of a DC or AC signal), and/or any other type of signal. In one embodiment, the indoor unit controller 234 may receive a signal from the outdoor unit controller indicating one or more operating values, such as speed for the indoor fan 238. In one embodiment, the operating value associated with the indoor fan 238 is an airflow, such as cubic feet per minute (CFM). In one embodiment, the outdoor unit controller 204 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 234 may be electrically connected (e.g., wired connection, wireless connection, etc.) to pressure sensor 244 and/or temperature sensor 246. In this regard, the indoor unit controller 234 can take pressure and/or temperature sensing measurements via pressure sensor 244 and/or temperature sensor 246. In one embodiment, pressure sensor 244 and temperature sensor 246 are located on the suction line (i.e., a predefined distance from indoor coil 32). In other embodiments, the pressure sensor 244 and/or the temperature sensor 246 may be located on the liquid line (i.e., a predefined distance from indoor coil 32).

Figure 3A:
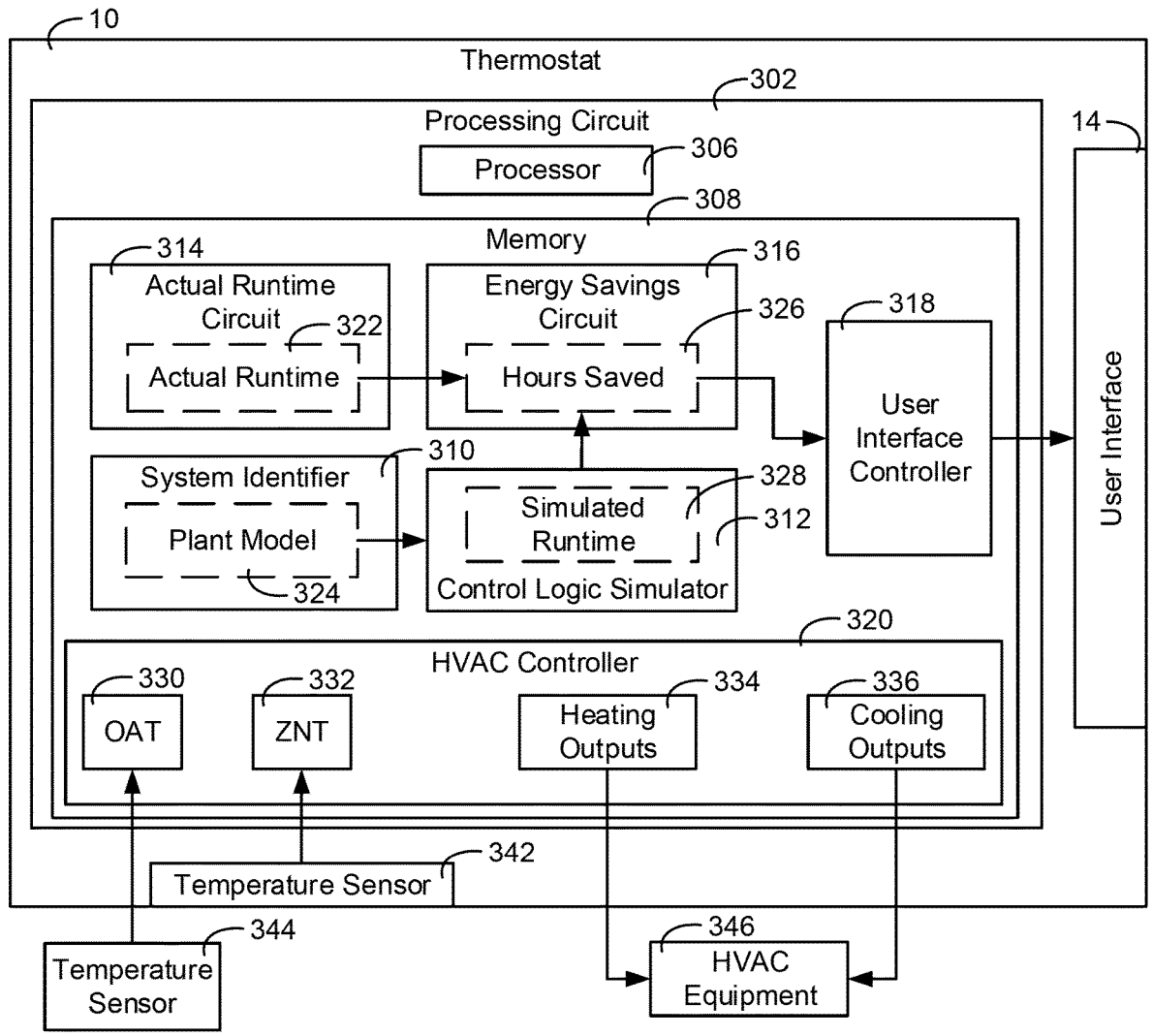
FIG. 3A is a block diagram of the thermostat of FIGS. 1A, 1B, and 2 shown in greater detail, according to an exemplary embodiment.

Referring now to FIG. 3A, the thermostat 10 as described with reference to FIGS. 1A-2 is shown in greater detail, according to an exemplary embodiment. The thermostat 10 is shown to communicate to temperature sensors 340 and HVAC equipment 346. In FIG. 3A, the thermostat 10 is shown to include the user interface 14.

The user interface 14 may be a touch screen display configured to receive input from a user and display images and text to a user. In some embodiments, user interface 14 is at least one or a combination of a resistive touch screen and a capacitive touch screen (e.g., projective capacitive touch screen). In some embodiments, the user interface 14 is a transparent touch screen device. In some embodiments, the user interface 14 is a laser display, a holographic display, a light field display, and/or any other display or combination of displays. The user interface 14 may be configured to display images and text to a user but may not be configured to receive input from the user. In some embodiments, the user interface 14 is one or a combination of a CRT display, an LCD display, an LED display, a plasma display, and/or an OLED display (e.g., a transparent OLED display).

The temperature sensors 342 and 344 can be configured to measure the ambient temperature of a building (e.g. the residence 24), the temperature of a zone associated with the building, and/or an outdoor temperature. Temperature sensors 342 and 344 may be sensors outputting an analog signal (e.g., sinusoid, square wave, PWM wave, etc.) and/or a measurable value (e.g. current, voltage, resistance) and/or may be a temperature module outputting a digital value. The temperature sensors 342 and 344 may communicate a digital and/or analog value to the thermostat 10. The temperature sensors 342 and/or 344 may be located inside an enclosure of the thermostat 10, outside the thermostat 10, outside a building, and/or inside a building. The temperature sensors 342 and 344 may be any other type or combination of temperature sensor. In some embodiments, temperature sensor 344 is an outdoor temperature sensor owned by a third party (e.g., a weather forecaster). The thermostat 10 may receive (e.g., receive via a network) the temperature from the weather forecaster which identifies outdoor temperature.

The temperature sensors 342 and 344 may be part of the thermostat 10, e.g., located in the same enclosure as thermostat 10, or may be external sensors. The thermostat 10 can receive, determine, and/or store measured temperature values of temperature sensors 342 and 344. The temperature measured by the temperature sensor 342 may be stored as zone temperature (ZNT) 332. The temperature measured by the temperature sensors 344 may be stored as an outdoor air temperature (OAT) 330.

The processing circuit 302 can include a processor 306 and a memory 308. The processor 306 can be a general purpose or specific purpose processor, an application specific integrated circuit (ASIC), one or more field programmable gate arrays (FPGAs), a group of processing components, or other suitable processing components. The processor 306 may be configured to execute computer code and/or instructions stored in the memory 308 or received from other computer readable media (e.g., CDROM, network storage, a remote server, etc.).

The memory 308 can include one or more devices (e.g., memory units, memory devices, storage devices, etc.) for storing data and/or computer code for completing and/or facilitating the various processes described in the present disclosure. The memory 308 can include random access memory (RAM), read-only memory (ROM), hard drive storage, temporary storage, non-volatile memory, flash memory, optical memory, or any other suitable memory for storing software objects and/or computer instructions. The memory 308 can include database components, object code components, script components, or any other type of information structure for supporting the various activities and information structures described in the present disclosure. The memory 306 can be communicably connected to the processor 306 via the processing circuit 302 and can include computer code for executing (e.g., by the processor 306) one or more processes described herein.

The memory 308 is shown to include an HVAC controller 320. The HVAC controller 320 can be configured to control the HVAC equipment 346. The HVAC equipment 346 can be the indoor unit 28 and/or the outdoor unit 30 as well as any industrial airside or waterside system or other HVAC equipment. Examples of such industrials systems can be found in detail in U.S. patent application Ser. No. 15/338,215 filed Oct. 28, 2016, the entirety of which is incorporated by reference herein.

The HVAC controller 320 may use any of a variety of control algorithms (e.g., state-based algorithms, extremum-seeking control algorithms, PID control algorithms, model predictive control algorithms, feedback control algorithms, etc.) to determine appropriate control actions for any HVAC equipment 346 connected to the thermostat 10 as a function of temperature and/or humidity.

The HVAC controller 320 is shown to store values for the OAT 330 and the ZNT 332. Further, the HVAC controller 320 is shown to store and/or determine, heating outputs 334 and cooling outputs 336. The heating outputs 334 may be commands to turn on one or more heating states of the HVAC equipment 346. The heating outputs 334 may be first and second stage heating, e.g., W1 and W2. Similarly, the cooling outputs 336 can be determined and/or stored by the HVAC controller 320 for various cooling stages of the HVAC equipment 346. For example, the cooling stages may be Y1 and Y2. Various other outputs can be determined and stored by the HVAC controller 320, for example, a fan output e.g., G, an auxiliary output, e.g., AUX, and/or any other output.

Based on the outputs for the HVAC equipment 346, the HVAC controller 320 may include one or more output circuits of the thermostat 10. The output circuits may be solid state switches, relays, triacs, FET switches, BJT switches, etc. Based on which heating or cooling stage that the HVAC controller 320 determines to turn on or off to meet a setpoint (e.g., the heating outputs 334 and/or the cooling outputs 336), the output circuits can be configured to cause the HVAC equipment 346 to be operated per the outputs (e.g., the heating outputs 334 and the cooling outputs 336) determined by the HVAC controller 320.

The memory 308 is shown to include an actual runtime circuit 314. The actual runtime circuit 314 is shown to determine and store an actual runtime 322. The actual runtime 322 may be one or more lengths of time that the HVAC controller 320 operates the HVAC equipment 346. The actual runtime circuit 314 may include one or more time keeping devices (e.g., 8-bit timers, 16-bit timers, 32-bit timers, etc.). When the HVAC controller 320 enables the HVAC equipment 346 to either heat or cool, the actual runtime circuit 314 can be configured to record the length of time the equipment was run, the starting and ending times of the run, etc. The actual runtime 322 may indicate the amount of time that the HVAC equipment 346 was run for during particular year, month, week, day, hour, and/or minute.

The memory 308 is shown to include a system identifier 310. The system identifier 310 can be configured to generate and/or store a plant model 324. The plant model 324 may be a thermal model of a building that the thermostat 10 is associated with (e.g., located in and/or configured to control heating and/or cooling for) and/or the HVAC equipment 346. The system identifier 310 can be configured to receive various inputs (e.g., OAT 330 and/or ZNT 332) from the HVAC controller 320 and/or various outputs (e.g., heating outputs 334 and/or the cooling outputs 336) and determine the plant model 324 based on said inputs and/or outputs. In some embodiments, the system identifier 310 records a historical database of inputs and outputs and trains the plant model 324 based on the historical inputs and/or outputs.

The memory 308 is shown to include a control logic simulator 312. The control logic simulator 312 is shown to generate simulated runtime 328 based on the plant model 324. The control logic simulator 312 can determine, for various OAT 330 and/or ZNT 332 values and the plant model 324, an amount of time (simulated runtime 328) that the thermostat 10 would run at for a particular setpoint value (e.g., 70 degrees Fahrenheit, 72 degrees Fahrenheit) without any occupancy detection, schedule setbacks, or other thermostat features that reduce the amount of time that the HVAC equipment 346 runs.

An energy savings circuit 316 is shown in FIG. 3A. The energy savings circuit 316 can be configured to receive the simulated runtime 328 from the control logic simulator 312 and the actual runtime 322 from the actual runtime circuit 314, respectively. The energy savings circuit 316 can be configured to take the difference between the simulated runtime 328 and the actual runtime circuit 314 to determine the hours saved 326. The energy savings circuit 316 can store the hours saved 326 and/or provide the hours saved 326 to the user interface controller 318 for display on the user interface 14.

The user interface controller 318 can be configured to cause the user interface 14 to display various energy savings information and/or allow the user to interact with the energy savings information. The user interface controller 318 can be configured to display various graphics, charts, and/or other indications of hours saved 326 for various periods of time (e.g., hours, days, weeks, months, years, etc.). In this regards, the user interface controller 318 can be configured to store the hours saved 326 for various hours, days, months, and/or years.

Figure 3B:
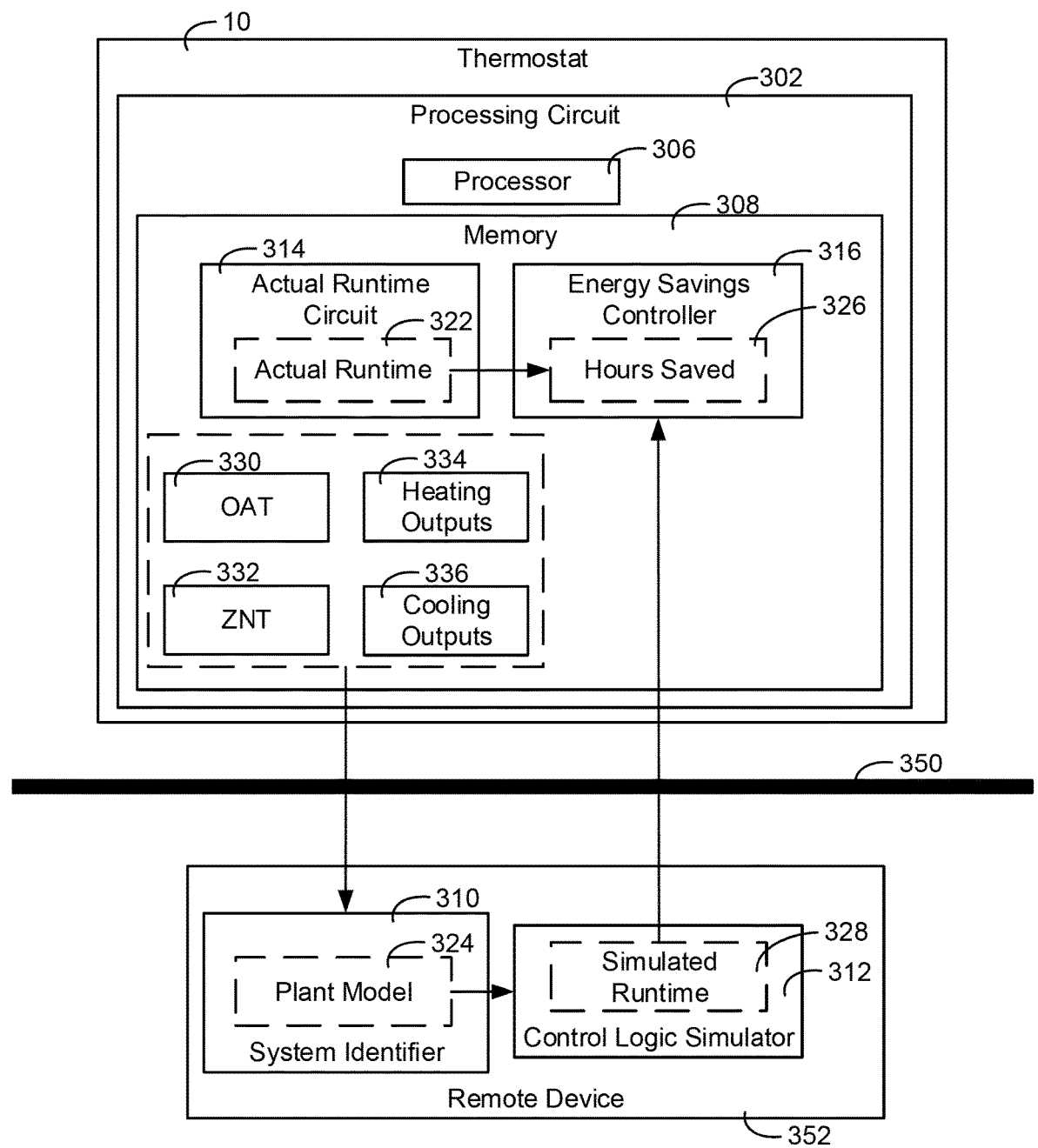
FIG. 3B is a block diagram of the thermostat of FIG. 3A communicating with a remote device, according to an exemplary embodiment.

Referring now to FIG. 3B, the thermostat 10 is shown to communicate with a remote device 352, according to an exemplary embodiment. In FIG. 3B, the thermostat 10 may receive simulated runtime 328 from the remote device 352 rather than determining the simulated runtime 328 by itself. FIG. 3B is shown to include a network 350. The remote device 352 may be a remote server or cloud computing platform. In various embodiments, the remote device 352 is a smartphone, tablet, laptop computer, desktop computer, or any other device configured to perform the functions of thermostat 10 (e.g., configured to implement the system identifier 310 and/or the control logic simulator 312). In some embodiments, the remote device 352 is an Android or Apple iOS based device including a mobile application configured to allow the device to implement the functionality of the thermostat 10 (e.g., configured to implemented the system identifier 310 and/or the control logic simulator 312).

In some embodiments, network 350 may include the Internet and/or other types of data networks, such as a local area network (LAN), a wide area network (WAN), a cellular network, a satellite network, or any other type of data network or combination thereof. The network 350 may include any number of computing devices (e.g., computers, servers, routers, network switches, etc.) configured to transmit, receive, or relay data. The network 350 may further include any number of hardwired and/or wireless connections. For example, the thermostat 10 may communicate wirelessly (e.g., using a WiFi or cellular radio, etc.) with a transceiver that is hardwired (e.g., via a fiber optic cable, Ethernet, a CAT5 cable, etc.) to a computing device (e.g., the remote device 352) in communication with the network 350. The network 350 may include services that facilitate managing the wireless and/or wired communication of devices connected to the network 350. Network vendors may include, for example, cellular telecommunications providers (e.g., Verizon, T-Mobile, AT&T, etc.) as well as internet service providers.

In some embodiments, the thermostat 10 is configured to transmit the OAT 330, the heating outputs 334, the ZNT 332, and/or the cooling outputs 336 to the remote device 352 via the network 350. The thermostat 10 may send the data as historical data entries, e.g., data for various points in time for a day, week, month, or year. The remote device 352 can be configured to receive the data and train the plant model 324 for the thermostat via the system identifier 310. The remote device 352 can be configured to generate the simulated runtime 328 by running the plant model 324 with the control logic simulator 312.

The remote device 352 can be configured to transmit the simulated runtime 328 to the thermostat 10. The thermostat 10 can be configured to receive the simulate runtime 328 from the remote device 352 via the network 350 and determine the hours saved 326 based on the received simulated runtime 328.

Figure 4:
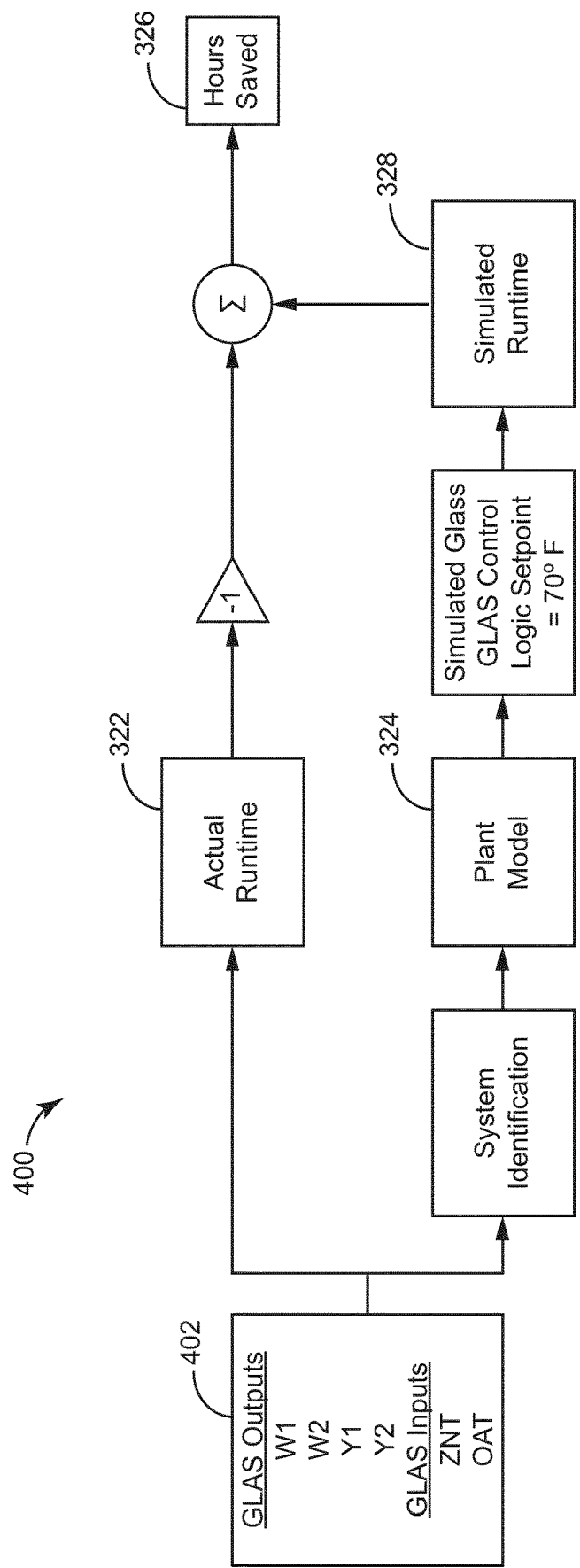
FIG. 4 is a block diagram the energy modeling features of the thermostat of FIG. 3A, according to an exemplary embodiment.

Referring now to FIG. 4, a block diagram of an energy savings model 400 illustrating the energy savings determinations of the thermostat 10 of FIG. 3A (or the remote device 352 of FIG. 3B) is shown, according to an exemplary embodiment. In general, the energy savings model 400 can approximate the energy saved by the use of the thermostat 10's auto-away (e.g., occupancy detection), scheduling features, and/or any other feature, which allows the thermostat 10 to reduce the runtime of the HVAC equipment 346. The thermostat 10 operating at a predefined setpoint (e.g., a 70 degree setpoint) may be used for the baseline comparison of the energy model 400.

The energy savings model 400 outputs the hours of run time saved (e.g., hours saved 326) by various energy savings features of the thermostat 10. The input to the energy savings model 400 (e.g., the inputs and outputs 402) can be various inputs e.g., control outputs (e.g., the heating outputs 334 and the cooling outputs 336) and/or various inputs (e.g., the OAT 330 and/or the ZNT 332). The energy savings model 400 can performs a system identification (e.g., generate the plant model 324) based on the input output data 402. The plant model 324 can be fed to an internal clone of the control logic of the thermostat 10 (e.g., fed into control logic simulator 312). The logic clone can then determine the simulated runtime 328. The energy savings (in hours), e.g., the hours saved 326, can then be determined by subtracting a given day's daily run time (e.g., actual runtime 322) from the simulated runtime 328.

The energy model 400 may assume that the temperature in a house, apartment, and/or room can be modeled by the system identifier 310 via the plant model 324 based on Equation 1, $$T_{ZNT} = T_{HVAC} + T_{OAT} + T_D \quad \text{(Equation 1)}$$

where $T_{ZNT}$ is the zone temperature measured by a temperature sensor (e.g., the temperature sensor 344), $T_{HVAC}$ is a temperature influence of the HVAC system, $T_{OAT}$ is the outdoor air temperature (e.g., measured by the temperature sensor 344), and $T_D$ represents internal temperature disturbances. The $T_D$ disturbances may include heat generated by electrical load, human body heat, solar radiance and other factors. $T_{HVAC}$ and $T_D$ shall be discussed in further detail below, respectively.

Determination of $T_{HVAC}$ Dynamics Through System Identification

The value of $T_{HVAC}$ may be dependent on a particular HVAC system (which may not be known to the thermostat 10). This system, for simplicity, may be assumed to be a linear time invariant system of some arbitrary order. The current value of $T_{HVAC}$ may be dependent on past values of $U_{HVAC}$ (e.g., the heating outputs 334 and/or the cooling outputs 336) as well as inputs such as whether the HVAC system is operational or not. The plant model 324 can be learned over time by the system identifier 310 observing and recording past inputs and outputs of the system. A transfer function representation of this system (e.g., plant model 324) can be Equation 2, $$H(z) = \frac{T_{HVAC}(z)}{U_{HVAC}(z)} = \frac{b_1 z^{-1} + b_2 z^{-2} + b_3 z^{-3} \cdots}{1 + a_1 z^{-1} + a_2 z^{-2} + a_3 z^{-3} \cdots} \quad \text{(Equation 2)}$$

where a and b represent transfer function coefficients that reflect the nature of the system. This transfer function can be rewritten in a one step ahead prediction form of Equation 3, $$T_{HVAC}(k+1) = -a_1 T_{HVAC}(k) - a_2 T_{HVAC}(k-1) - a_3 T_{HVAC}(k-2) \ldots b_1 U_{HVAC}(k) b_2 U_{HVAC}(k-1) + b_2 U_{HVAC}(k-2) \quad \text{(Equation 3)}$$

In some embodiments, the system identifier 310 can use Equation 3 to estimate $T_{HVAC}$ while concurrently estimating $T_D$ using one of the equations discussed below, for example, Equation 31.

Taking the Jacobian, with respect to the parameters, of data from the plant model 324 would be Equation 4, $$J = \begin{bmatrix} T_{HVAC}(k-1) & T_{HVAC}(k-2) & T_{HVAC}(k-3) & \ldots & U_{HVAC}(k-1) & U_{HVAC}(k-2) & U_{HVAC}(k-3) & \ldots \\ T_{HVAC}(k-2) & T_{HVAC}(k-3) & T_{HVAC}(k-4) & \ldots & U_{HVAC}(k-2) & U_{HVAC}(k-3) & U_{HVAC}(k-4) & \ldots \\ T_{HVAC}(k-3) & T_{HVAC}(k-4) & T_{HVAC}(k-5) & \ldots & U_{HVAC}(k-3) & U_{HVAC}(k-4) & U_{HVAC}(k-5) & \ldots \\ & & & \vdots & & & & \\ & & & \vdots & & & & \\ T_{HVAC}(n-1) & T_{HVAC}(n-2) & T_{HVAC}(n-2) & \ldots & U_{HVAC}(n-1) & U_{HVAC}(n-2) & U_{HVAC}(n-3) & \ldots \end{bmatrix} \quad \text{(Equation 4)}$$

This Jacobian is for a series of n samples with respect to the parameter. Given this, one can solve for the optimal parameters (in the L2 norm sense) through the normal equation, Equation 5, $$[-a_1, -a_2, -a_3, \ldots, b_1, b_2, b_3, \ldots] = (J^T J)^{-1} J^T T_{HVAC} \quad \text{(Equation 5)}$$

However, this application is not possible because $T_{HVAC}$, or the effect of the HVAC system, may not be directly measurable. $T_{HVAC}$ can be calculated by Equation 6, $$T_{HVAC} = T_{ZNT} - T_{OAT} - T_D \quad \text{(Equation 6)}$$

However, $T_D$ is also not measured and is unknown. As a result, this problem is a nonlinear least squares problem. In this case, the disturbance can be approximated by a time varying polynomial. A cubic polynomial can be selected in order to allow the model sufficient ability to change over the course of a day.

$$T_D = c_3 t^3 + c_2 t^2 + c_1 t + c_0 \quad \text{(Equation 7)}$$

Next, the model parameters θ can be defined as in Equation 8, $$\theta = [-a_1, -a_2, -a_3, \ldots, b_1, b_2, b_3, \ldots, c_3, c_2, c_1, c_0] \quad \text{(Equation 8)}$$

To solve this, a non-linear-least-square (NLSQ) method can be used such as the Levenberg Marquadrt algorithm. This algorithm iteratively solves using the following calculations in Equations 9-16, $$\epsilon = 10^{-10} \quad \text{(Equation 9)}$$

$$r_k = \hat{T}_{ZNT} - T_{ZNT} \quad \text{(Equation 10)}$$

$$J_k = \frac{r(\theta_k + \epsilon) - r(\theta_k)}{\epsilon} \quad \text{(Equation 11)}$$

$$p_k = (J_k^T J_k + \lambda_k I)^{-1} J_k^T r_k \quad \text{(Equation 12)}$$

$$\text{if}(r_k(\theta_k) > r_k(\theta_k + p_k)) \quad \text{(Equation 13)}$$

$$\theta_{k+1} = \theta_k + p_k \quad \text{(Equation 14)}$$

$$\lambda_{k+1} = \lambda_k \cdot 0.1 \quad \text{(Equation 15)}$$

else $$\lambda_{k+1} = \lambda_k \cdot 10 \quad \text{(Equation 16)}$$

The following Equations define the parameters of Equations 9-16, $$k = \text{Iteration Step} \quad \text{(Equation 17)}$$

$$\theta = \text{Parameters} \quad \text{(Equation 18)}$$

$$\epsilon = \text{Jacobian Precision} \quad \text{(Equation 19)}$$

$$T_{ZNT} = \text{Measured Temperature} \quad \text{(Equation 20)}$$

$$\hat{T}_{ZNT} = \text{Estimated Temperature} \quad \text{(Equation 21)}$$

$$r_k = \text{Residual Vector} \quad \text{(Equation 22)}$$

$$J_k = \text{Finite Difference Jacobian} \quad \text{(Equation 23)}$$

$$p_k = \text{Step} \quad \text{(Equation 24)}$$

$$\lambda_k = \text{Damping Parameter} \quad \text{(Equation 25)}$$

This algorithm can be run a fixed number of iterations to give it consistent runtime characteristics.

Initial Guess of $\theta_0$

Since this problem is a non-linear estimation problem, it is non convex and requires an initial guess of θ which is annotated as $\theta_0$. Unfortunately, the performance and success of most non-linear estimation problems are highly dependent on the initial guess. Consequently, an intelligent guess of $\theta_0$ may be required in order for this algorithm to work. Ideally the a, b parameters could be solved initially through least squares. This may be dangerous because it can result in an unstable system. Consequently, $T_{HVAC}$ can be calculated in such a way to ensure the model stability. A different calculation method can be used if the model (e.g., the plant model 324) is of a HVAC heating system (Equation 26) or an HVAC cooling system (Equation 27), $$T_{HVAC_0 Heating} = T_{ZNT} - T_{OAT} - \min(T_{ZNT} - T_{OAT}) \quad \text{(Equation 26)}$$

$$T_{HVAC_0 Cooling} = T_{ZNT} - T_{OAT} - \max(T_{ZNT} - T_{OAT}) \quad \text{(Equation 27)}$$

Then the initial a, b parameters can be calculated with the normal equation, Equation 28, $$[-a_1, -a_2, -a_3, \ldots b_1, b_2, b_3, \ldots]_0 = (J^T J)^{-1} J^T T_{HVAC_0} \quad \text{(Equation 28)}$$

For the initial guess of disturbance related parameters, for simplicity, it can be assumed initially to be constant. Consequently, $c_0$ of Equation 28 is the only parameter that needs to be calculated, which can include:

$$c_{0\,Heating} = \min(T_{ZNT} - T_{OAT}) \quad \text{(Equation 29)}$$

$$c_{0\,Cooling} = \max(T_{ZNT} - T_{OAT}) \quad \text{(Equation 30)}$$

Using these equations for initial guesses helps ensure convergence to a reasonable result that is stable. After collecting day(s) worth of data (e.g., collecting OAT 330, ZNT 332, heating outputs 334, and/or cooling outputs 336), the above procedure can be performed by the system identifier 310 to determine the plant model 324. This plant model 324 can then be controlled by the control logic simulator 312 to create a baseline of what a typical thermostat 10 would have used in the environment modeled by the plant model 324.

Kalman Identification of $T_D$

Since $T_D$, the temperature disturbance, varies day to day, the $T_D$ of yesterday is not necessarily applicable for the next day. Consequently, $T_D$ must be constantly estimated for the plant model 324 on a given day by the system identifier 310. A good general purpose estimator is the Kalman filter. The OAT 330 as well as the previously identified plant model (e.g., a plant model 324 for a previous day) can be used by the system identifier 310 to identify $T_D$. However, in order to use a Kalman filter, the plant model 324 can be converted to state space. The following Equation can used to convert the transfer function model to state space, $$A = \begin{pmatrix} -a_1 & 1 & 0 & \cdots & 0 & 0 \\ -a_2 & 0 & 1 & 0 & \vdots & 0 \\ \vdots & \vdots & 0 & \ddots & 0 & 0 \\ a_{n-1} & 0 & \vdots & \ddots & 1 & 0 \\ -a_n & 0 & 0 & \cdots & 0 & 0 \\ 0 & 0 & 0 & \cdots & 0 & 1 \end{pmatrix}, B = \begin{pmatrix} b_1 - a_1 b_0 \\ b_2 - a_2 b_0 \\ \vdots \\ b_{n-1} - a_{n-1} b_0 \\ b_n - a_n b_0 \\ 0 \end{pmatrix}, \quad \text{(Equation 31)}$$

$$X = \begin{pmatrix} T_{HVAC}(k) \\ T_{HVAC}(k+1) \\ \vdots \\ T_{HVAC}(k+n) \\ T_D \end{pmatrix}, C = (1\ 0\ \cdots\ 0\ 1)$$

When the Kalman filter operates on live data, it estimates the $T_D$ which actively accounts for temperature disturbance during a given day.

Referring again to FIG. 3A, the system identifier 310 can be configured to reject data to model the plant model 324 in response to insufficient excitation (operation) of the HVAC equipment 346. In this regard, the system identifier 310 can be configured to record the length of time that the HVAC equipment 346 is operated by the HVAC controller 320. In response to determining that the HVAC equipment 346 has operated for a time greater than a predetermined amount, the system identifier 310 can use recorded data (e.g., OAT 330, ZNT 332, heating outputs 334, and/or cooling outputs 336) to train the plant model 324. However, if the operation time is less than the predetermined amount, the system identifier 310 can be configured to not use the recorded data and can skip training the plant model 324 for that particular day.

In some embodiments, OAT 330 is not present or reliable i.e., the temperature sensor 344 is not properly reading temperature or a network connection over which the thermostat 10 receives the OAT 330 is not available. Any heating outputs 334 and/or cooling outputs 336 used to train the system plant model 324 may be ignored by the system identifier 310. Further, data for the entire day where OAT 330 is unavailable or unreliable may be ignored.

The plant model 324 can be generated for any kind of environment with any kind of equipment controlling the environment. For example, the heating outputs 334 and the cooling outputs 336 may be outputs for single-stage or multi-stage equipment, air conditioners, furnaces, heat pumps, industrial airside systems, VAV systems, for VFR systems, for waterside systems, etc.

In some embodiments, the system identifier 310 stores multiple plant models 324. For example, if the environment controlled by the thermostat 10 has heating and cooling systems, the system identifier 310 can be configured to generate a heating system plant model and a cooling system plant model and use the heating system plant model and the cooling system plant model when the thermostat 10 is heating or cooling respectively. Further, the system identifier 310 can be configured to generate thermal models specifically for heat pumps. For example, the system identifier 310 can be configured to generate a plant model for the heat pump when the reversing valve of the heat pump causes the heat pump to operate as an air conditioner. Further, the system identifier 310 can be configured to generate second plant model for the heat pump when the reversing valve of the heat pump causes the heat pump to operate as a heat pump. These various models can be updated over time, providing that each day of data recorded meets the various requirements of sufficient runtime of the HVAC equipment 346 and reliability of the OAT 330.

The system identifier 310 can be configured to determine whether the plant model 324 (or any number of plant models stored by the system identifier 310) is stable or unstable. If the model is unstable, it may be discarded and a new model may be trained. In some embodiments, the system identifier 310 can be configured to use the NLSQ algorithm modified to be based on a L1-norm as opposed to the traditional L2-norm in order to better reject outliers.

Figure 5:
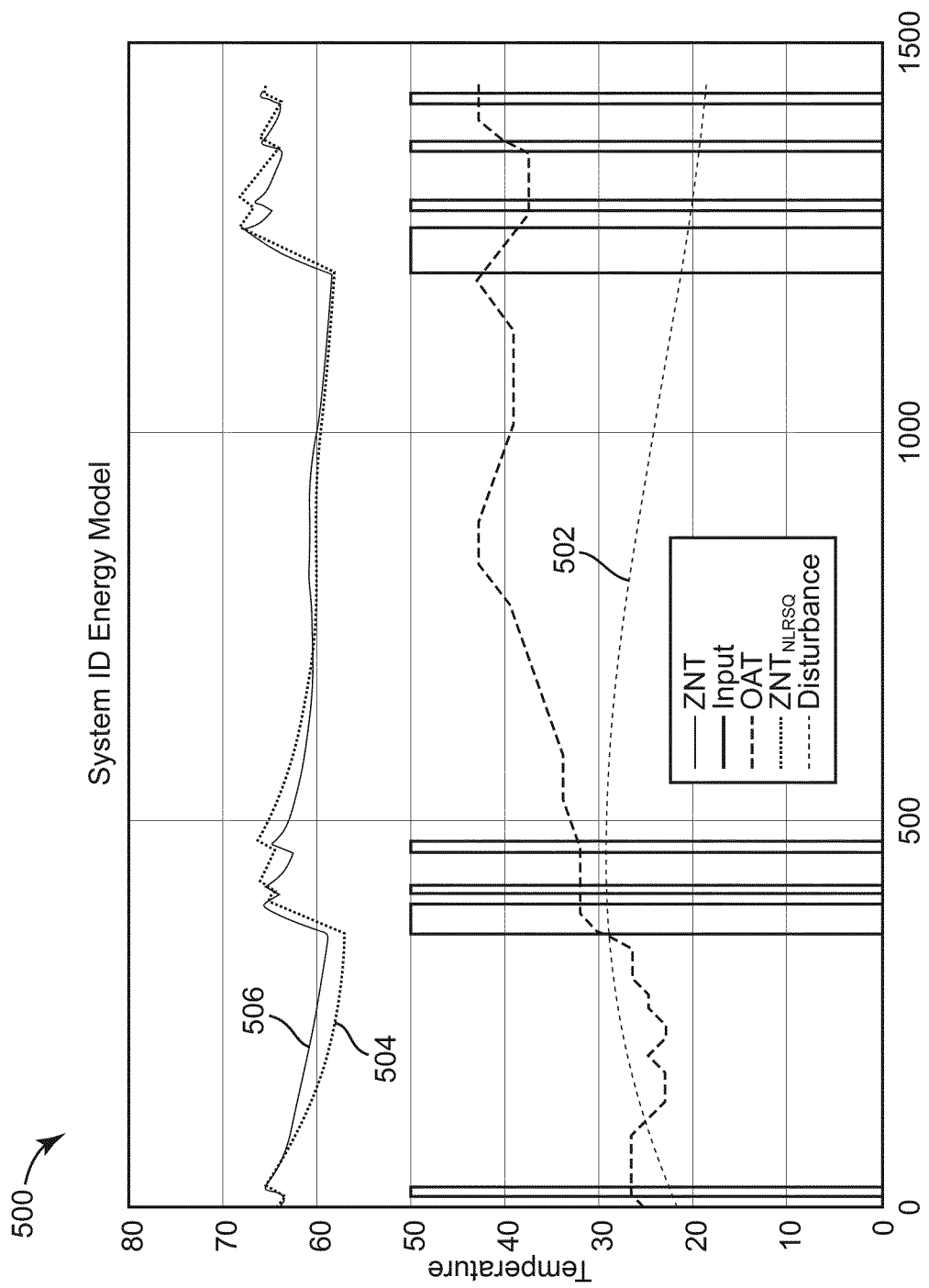
FIG. 5 is a chart illustrating system identification that can be performed by the thermostat of FIG. 3A, according to an exemplary embodiment.

Referring now to FIG. 5, chart 500 illustrates an example of the plant model 324, according to an exemplary embodiment. In chart 500, the system identification process that can be performed by the system identifier 310 is shown identifying a plant model 324 for a real world home. The resulting disturbance 502 ($T_D$) and simulated temperature 506 (the simulated temperature of the plant model 324, $\hat{T}_{ZNT}$) are shown below as well as the actual temperature 504 for that day (the ZNT 332).

Figure 6:
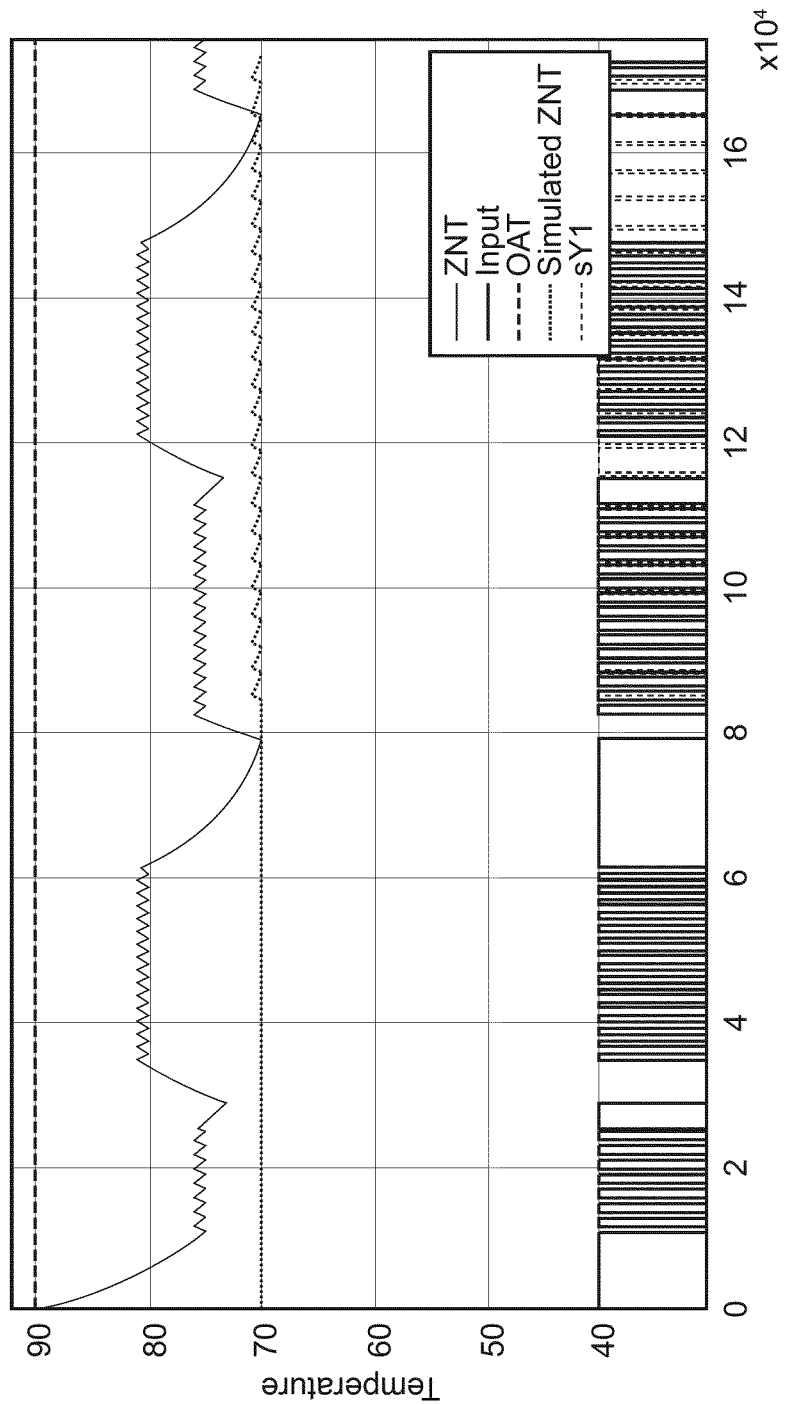
FIG. 6 is a chart illustrating a plant simulation, according to an exemplary embodiment.

Referring now to FIG. 6, chart 600 illustrates the plant model 324 being simulated by the control logic simulator 312, according to an exemplary embodiment. The chart 600 illustrates the system identification process (e.g., the system identifier 310 training the plant model 324) and feeding the model into the simulated control loop (e.g., the control logic simulator 312).

Figure 7:
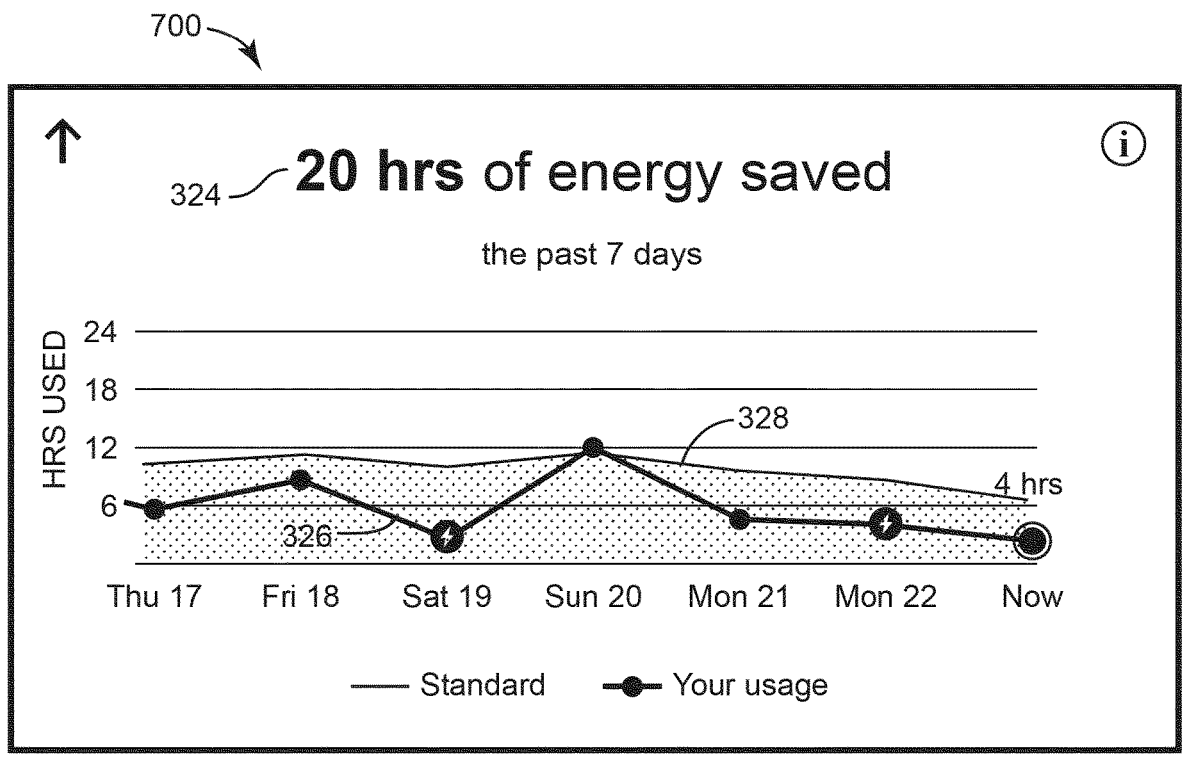
FIG. 7 is a user interface indicating energy savings of the thermostat of FIG. 3A, according to an exemplary embodiment.

Referring now to FIG. 7, an interface 700 that the user interface controller 318 can cause the user interface 14 to display is shown, according to an exemplary embodiment. The user interface 700 illustrates days of a week and hours of runtime on a x-axis and a y-axis. Interface 700 illustrates the actual runtime (e.g., the actual runtime 322) for each day in a first color (light green) and illustrates the simulated runtime (e.g., the simulated runtime 328) for each day in grey.

Energy Savings Interfaces

Referring generally to FIGS. 8-28, user interfaces for displaying energy savings to a user via the user interface 14, according to various exemplary embodiments. The user interface controller 318 can be configured to generate the user interfaces shown in FIGS. 8-24 and cause the user interface 14 to display the user interface, and users to interact with the user interfaces.

Referring now to FIG. 8-14, user interfaces for a coachmarks process that the user interface controller 318 can be configured to perform are shown. The coachmarks process may be part of a startup wizard that walks a user through various features of the thermostat 10 when the user first installs and powers on the thermostat 10. In some embodiments, the coachmarks process first occurs when the user accesses the energy savings features of the thermostat 10 via the user interface 14.

Figure 8:
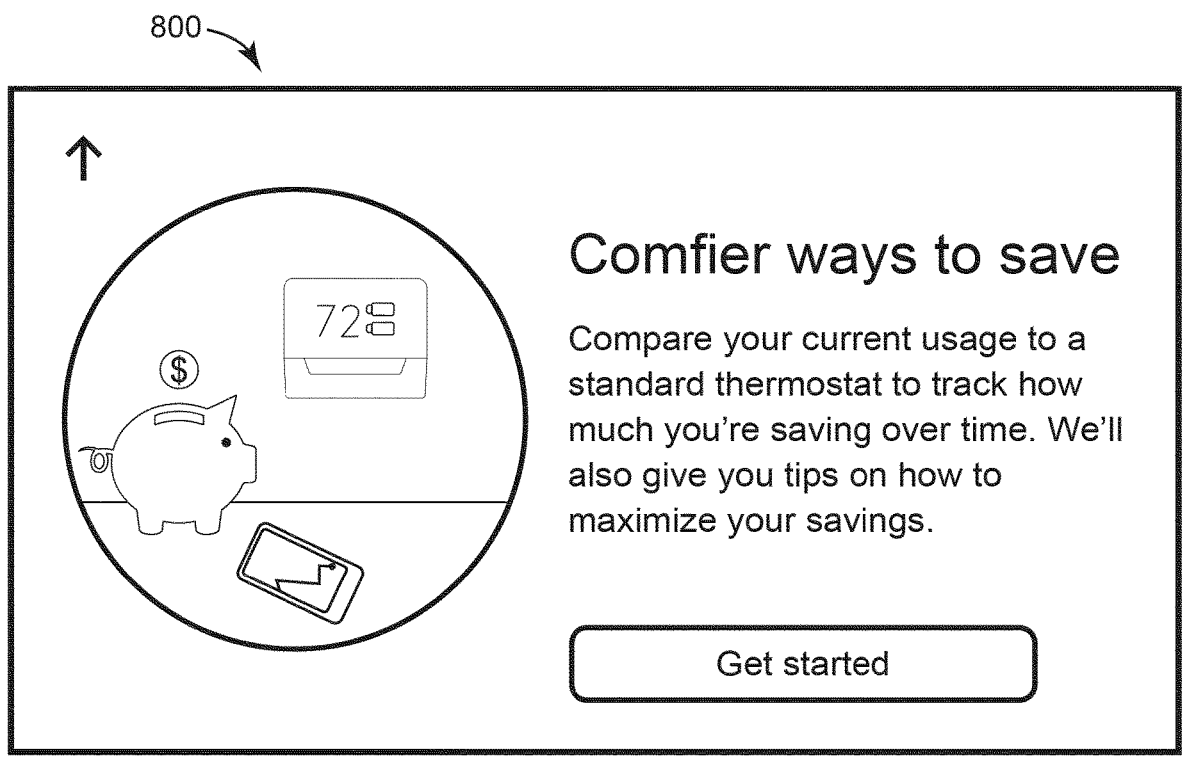

Referring now to FIG. 8, interface 800 illustrates a first interface of the coachmarks process. The first time a user enters, via the user interface 14, the energy savings information of the thermostat 10, the user interface controller 318 can be configured to cause interface 800 to be displayed. If the user presses the "Get Started" button of interface 800, the coachmarks process may begin (e.g., the user interface controller 318 may cause user interface 900 or 1000 to be displayed). If the user presses the arrow button of interface 800, the user interface controller 318 may navigate the user to a "Quick View" interface (e.g., a homescreen). The coachmarks process may not be skippable if the user is running the coackmarks process for a first time. The coackmarks can be restarted at any time from a settings menu interface of the thermostat 10.

Figure 9:
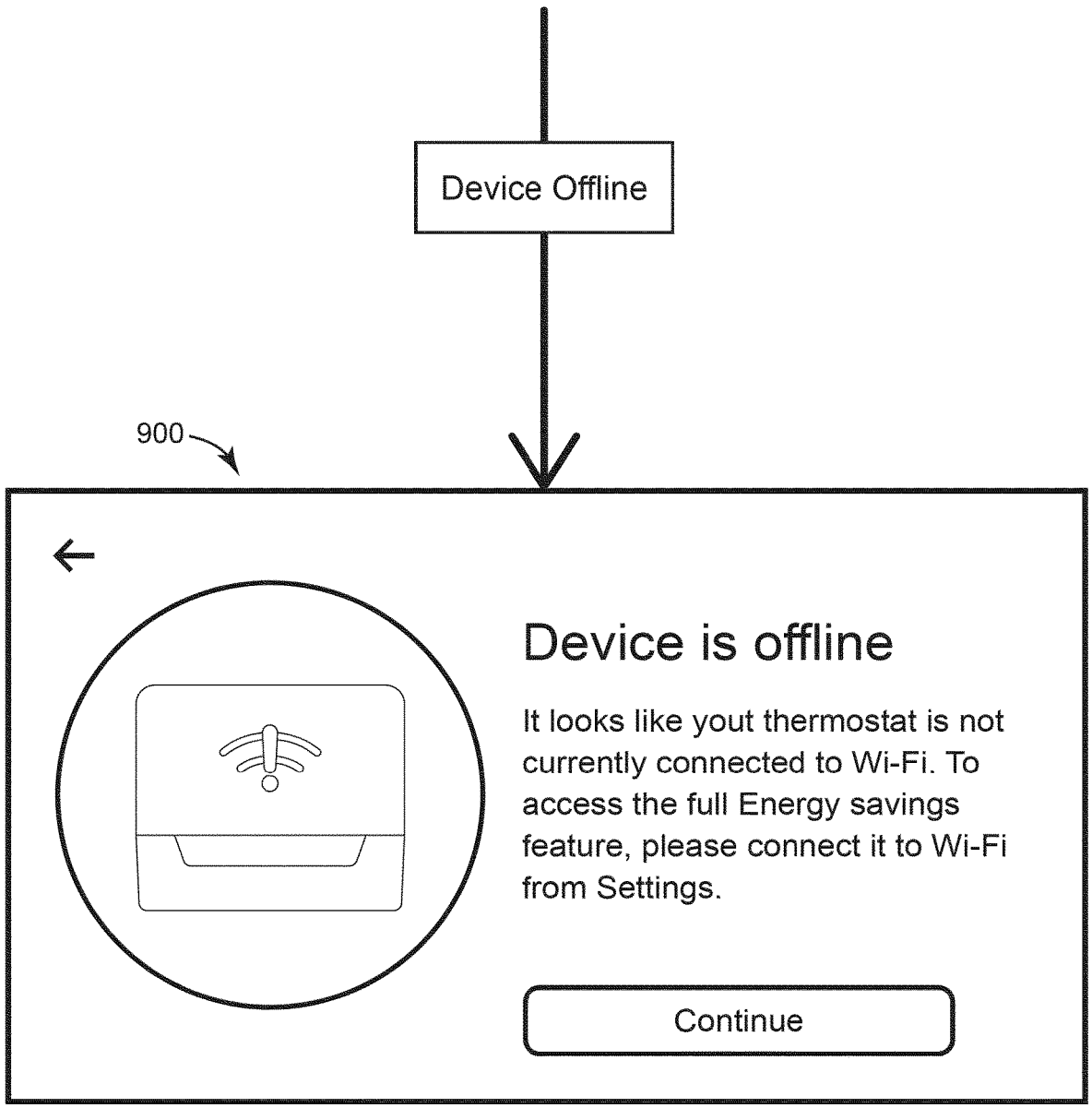

Referring now to FIG. 9, an interface 900 is shown for informing the user of the current network connection of the thermostat 10. If the thermostat 10 connects to a wireless network (e.g., a Wi-Fi network), and the thermostat 10 experiences a drop in connectivity or if a user attempts to access the energy savings displays of the thermostat 10 without the thermostat 10 being connected to the wireless network, the user may be informed via interface 900 that the thermostat 10 is offline and they max experience limited feature functionality of the energy savings display. If the user presses the continue button, the user may be navigated to the user interface 1000.

Figure 10:
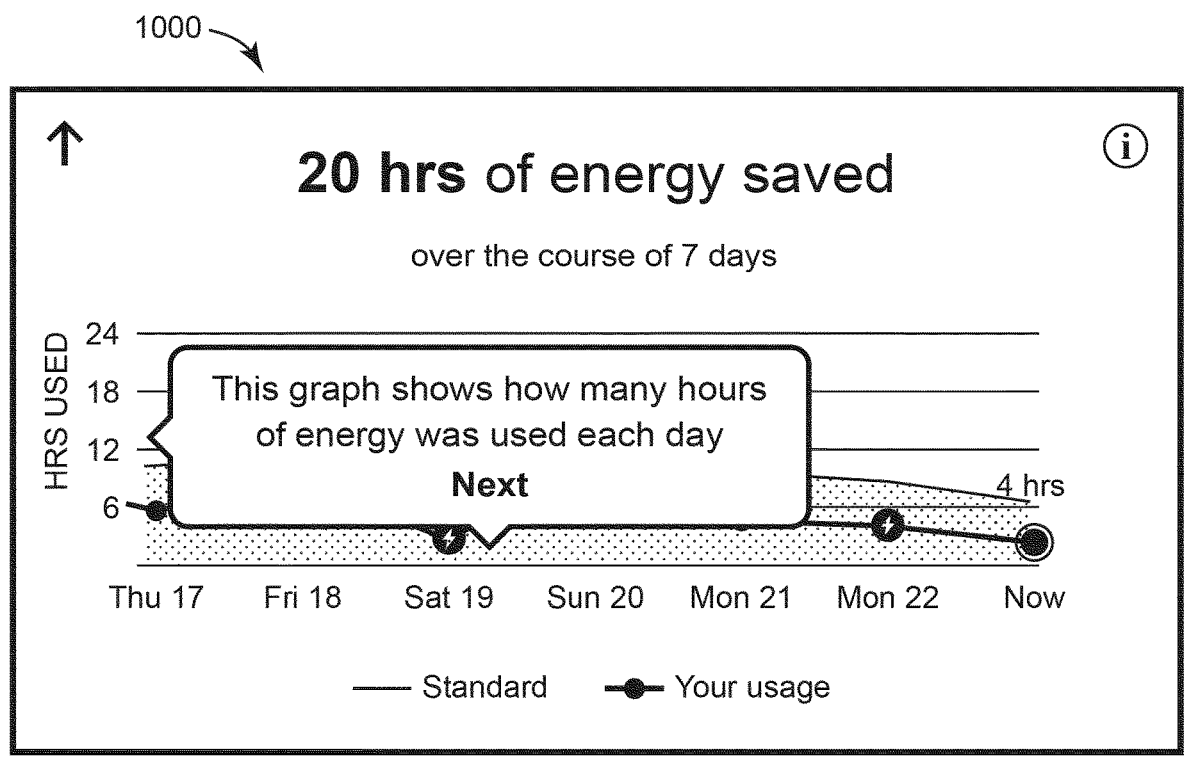

Referring now to FIG. 10, a user interface 1000 is shown introducing a user to the two axis of the energy savings graph. The horizontal axis may be a day while the vertical axis may be the number of hours that the thermostat 10 has run the HVAC equipment 346 as compared to a simulated runtime. If the user presses the next button, the user may be navigated to the next tip e.g., the user interface 1100.

Figure 11:
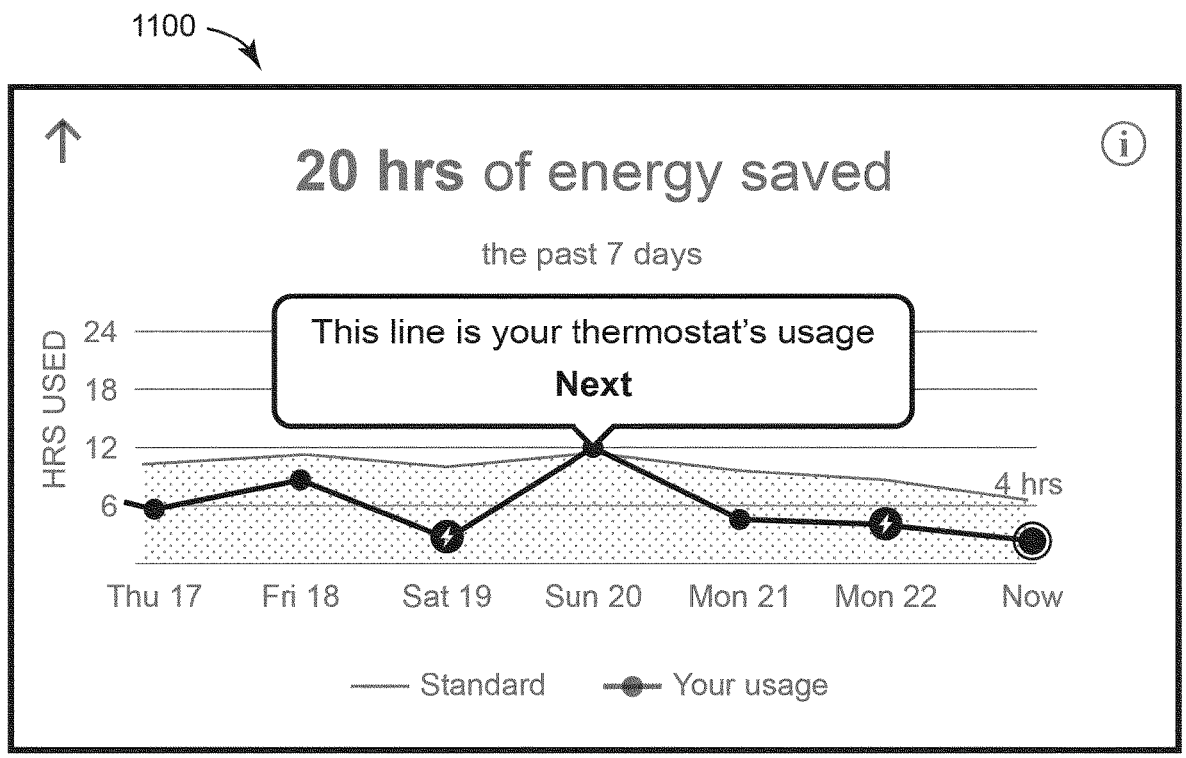

Referring now to FIG. 11, a user interface 1100 displays energy savings with a line connecting one or more data points, the runtime for various days. The user interface 1100 illustrates the energy usage of thermostat 10 to a user by referencing the line. If the user presses the next button, the user may be navigated to a user interface 1200.

Figure 12:
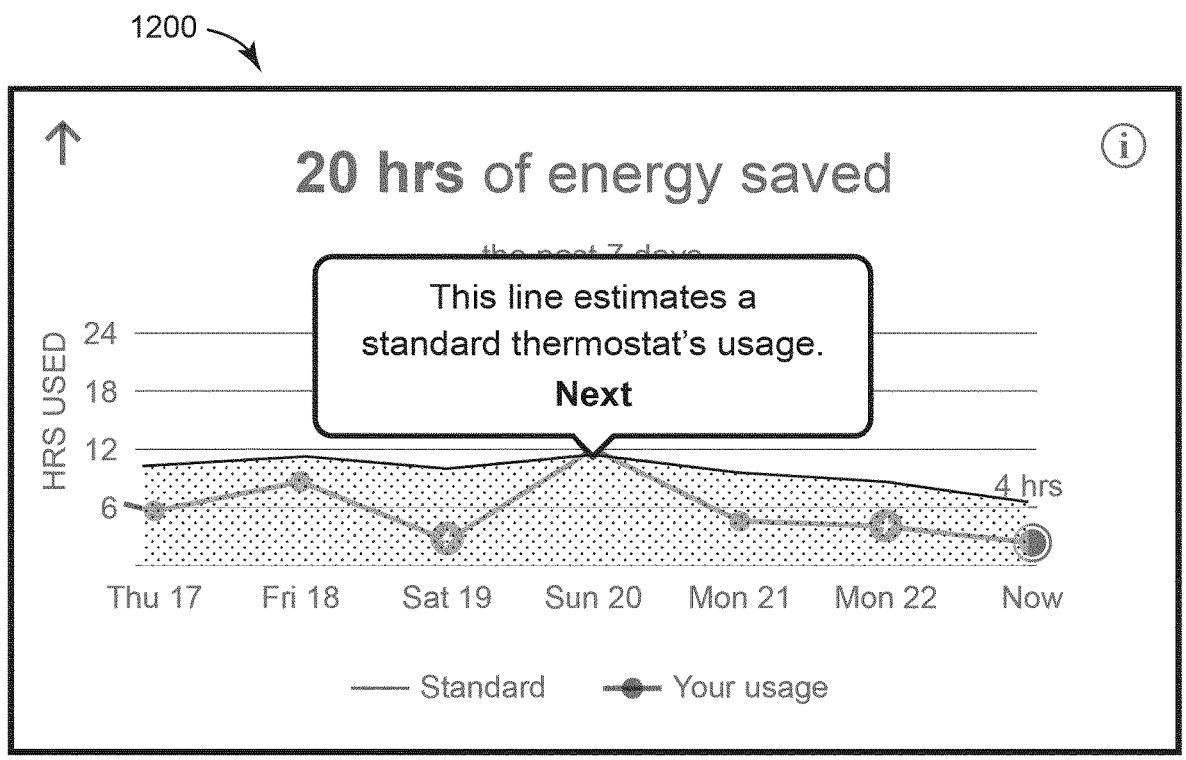

Referring now to FIG. 12, a user interface 1200 displays the standard hours of runtime for the thermostat 10. The standard thermostat runtime may be an estimate (e.g., the simulated runtime 328) of the energy usage (e.g., runtime) of the standard energy usage of the thermostat 10. If the user presses the next button of the interface 1100, the user may be navigated to the user interface 1300.

Figure 13:
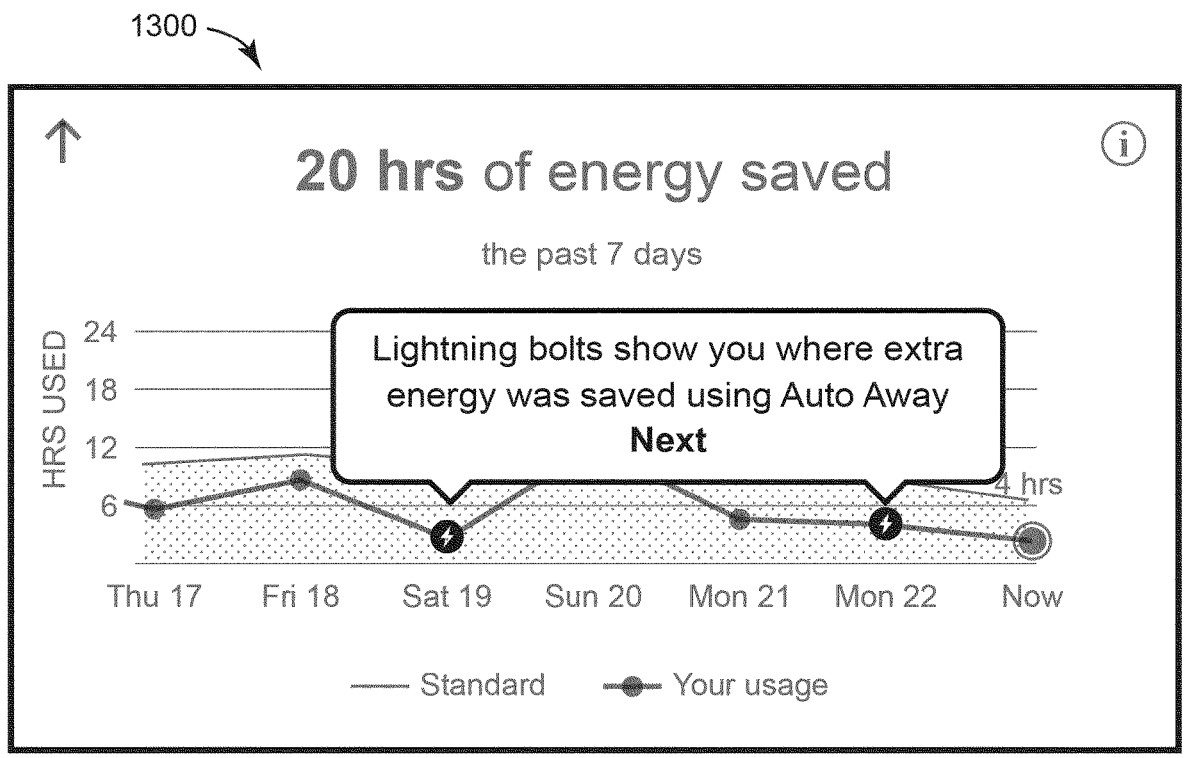

Referring now to FIG. 13, a user interface 1300 is shown which indicates where extra energy was saved by the thermostat 10 via lightning bolts. These locations of extra energy savings lightning bolts may be located on days where the runtime of the HVAC equipment 346 was particularly low (e.g., lower than a predefined amount or a predefined amount lower than the baseline runtime). If the user presses the next button, the user may be navigated to the user interface 1400.

Figure 14:
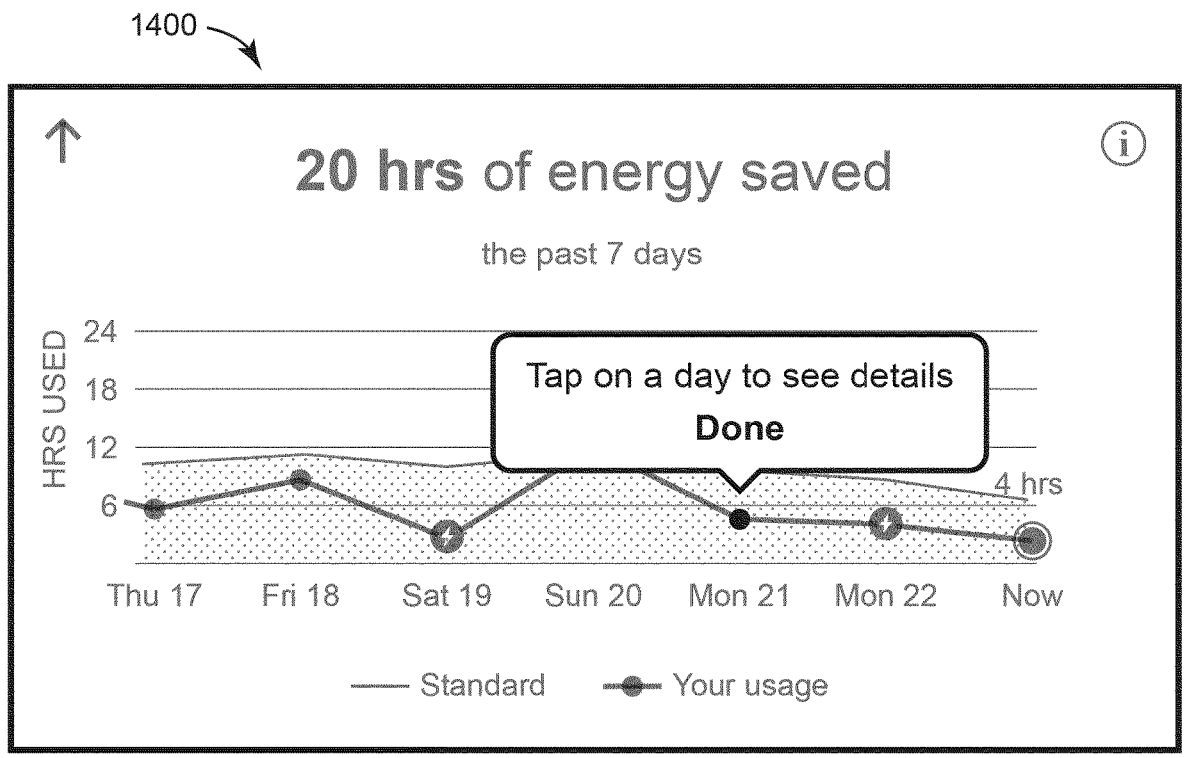

Referring now to FIG. 14, a user interface 1400 is shown which instructs a user how to interact with a particular day to view more energy usage information for the particular day. If the user presses the done button, the coachmarks process is complete and the user will be directed to a week view interface, e.g., the user interface 1500. Once the user presses the done button, they will not be taken through the coachmarks process again the user attempts to interact with the energy savings feature a second time. If the thermostat 10 crashes or reboots before the user presses the done button, the user should restart the coachmarks process from the beginning of the touch the next time they interact with the energy savings feature.

Figure 15:
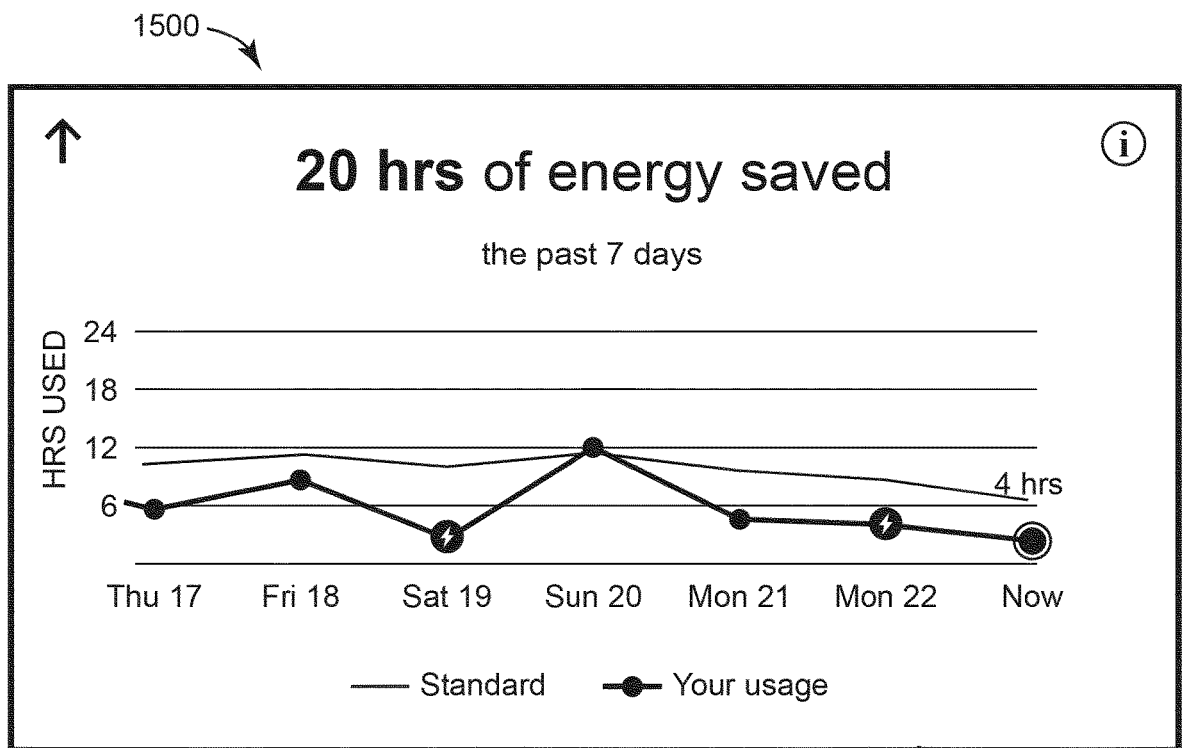

Referring now to FIG. 15, a week view interface 1500 is shown, illustrating energy usage of the thermostat 10 for a particular week, according to an exemplary embodiment. The interface 155 can display a rolling sum of energy savings hours for each day over the past seven days. The user can compare usage between their systems actual runtime and an estimate of the runtime of the thermostat 10. If the user presses the arrow, the user is navigated to a quick view interface (e.g., a homescreen).

If the user presses a particular day of the interface 1500, e.g., Friday the $18^{th}$, the user will be navigated to a user interface corresponding to the energy usage of that particular day. Interface 1600 is a day view illustrating the energy usage of a particular day, Friday the $18^{th}$. The lightning bolts shown in interface 1500 marks where very low amounts of energy (e.g., low amounts of equipment runtime) are consumed. The lightning bolt may indicate where an "auto away" energy savings feature is activated by the thermostat 10. The auto away energy savings feature may cause the thermostat 10 to operate in a particular low energy usage mode when no users are detected in an environment associated with the thermostat 10 for a predefined amount of time.

In some embodiments, the thermostat 10 receives the energy usage information to be displayed in user interface 1500 from a mobile application, a remote server, and/or any other remote computing device. In this regard, the interface 1500 may only be available to a user if the user if the thermostat 10 is connected to a network connection by which the thermostat 10 can retrieve the energy usage information.

Figure 16:
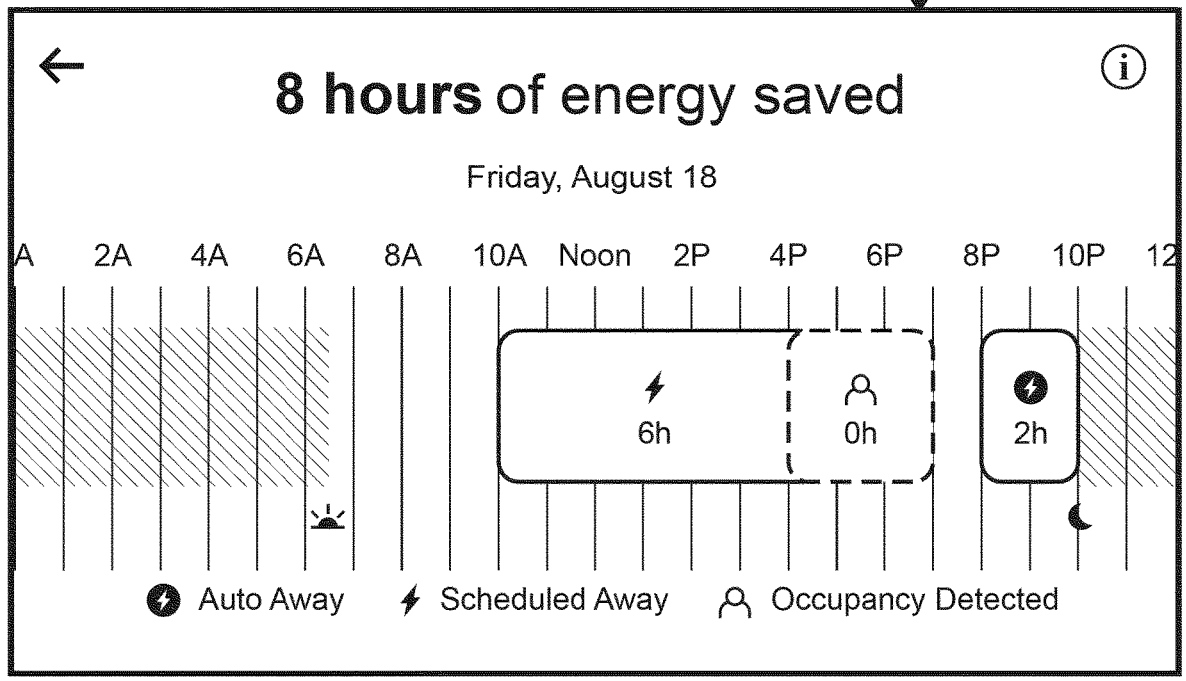

Referring now to FIG. 16, a day view interface 1600 is shown illustrating the energy usage of the thermostat 10 for a particular day selected by the user via the week view interface 1500. When the user taps on a specific day of the week view interface 1500, the user will be navigated to a detailed view of the tapped day. The user can view the wake and sleep times of the thermostat 10, scheduled events, and auto away events. If the user comes home early during an away event, the interface 1600 may display an occupancy block on top of the away event. The away event hours saved may be updated based on the occupancy detection.

Figure 17:
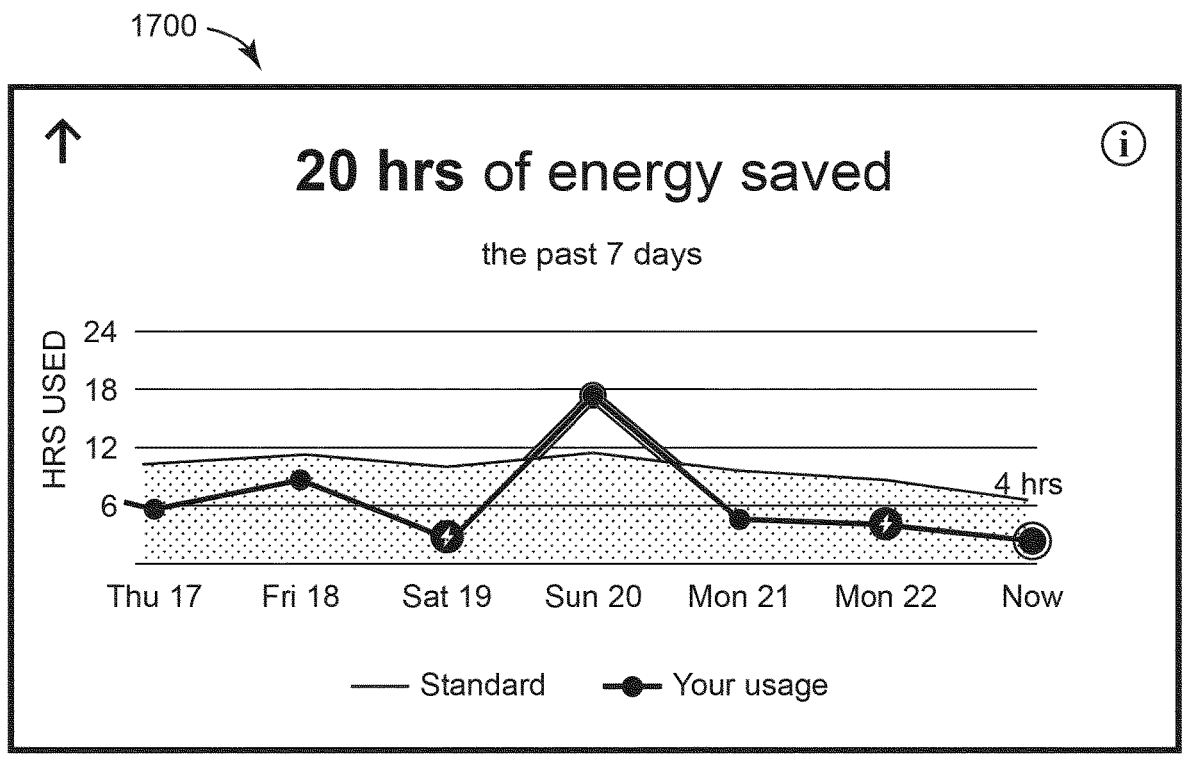

Referring now to FIG. 17, another week view interface 1700 is shown, according to an exemplary embodiment. The interface 1700 indicates where energy usage of the thermostat 10 exceeded the baseline amount, i.e., the actual runtime of the thermostat 10 was greater than the simulated runtime. The interface 1700 may indicate days with high energy usage (e.g., days where the actual runtime exceeds the simulated runtime) as yellow.

Figure 18:
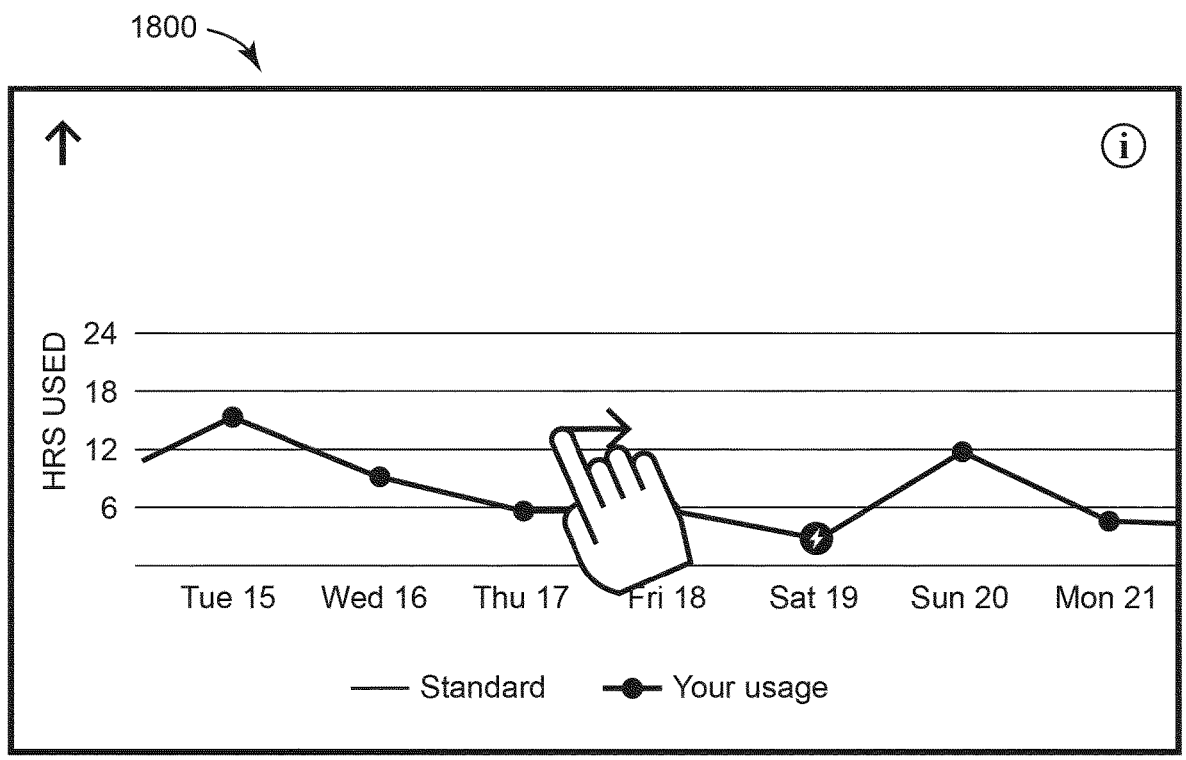

Referring now to FIG. 18, an interface 1800 is shown allowing a user to swipe the interface 1800 horizontally to view various days of a week and the energy savings for each day. A user can view various days of a particular month or months. The text displaying hours of energy savings may disappear in response to a user swiping left or right in interface 1800.

Figure 19:
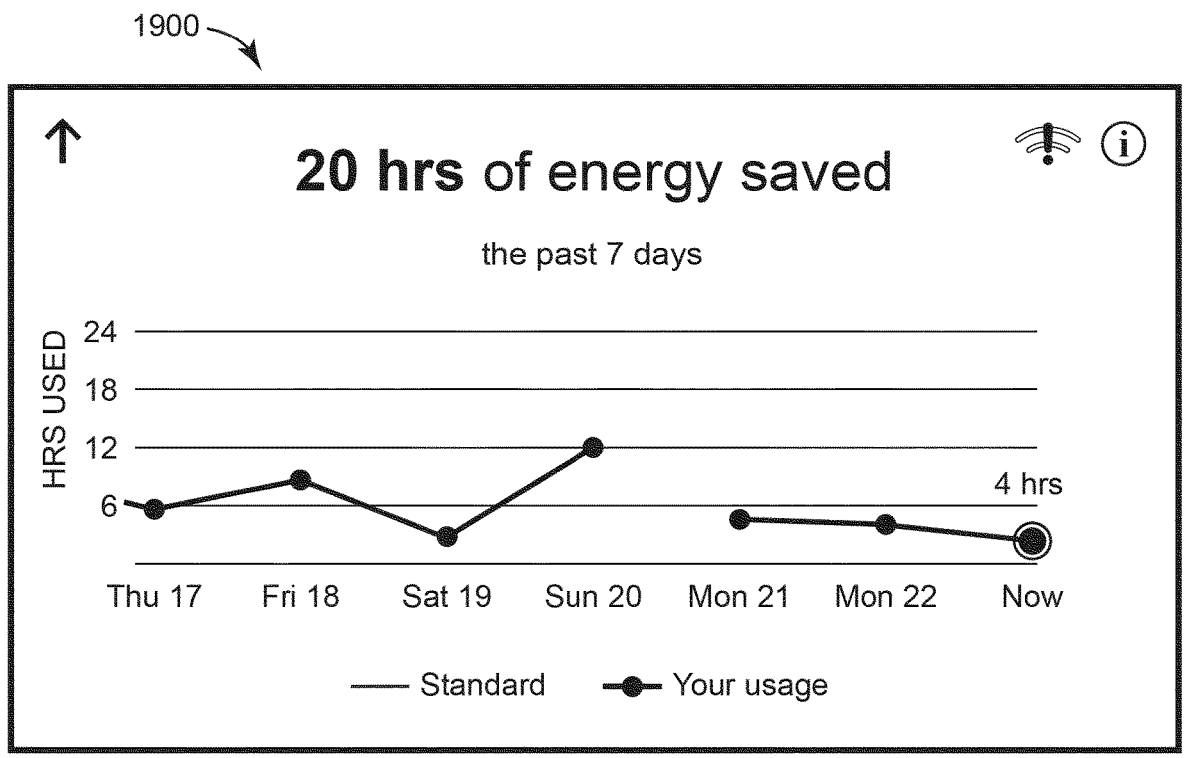

Referring now to FIG. 19, another week view interface 1900 is shown, according to an exemplary embodiment. The interface 1900 illustrates energy usage of the thermostat 10 for a week but does not display the baseline runtimes. The interface 1900 may be displayed on the thermostat 10 when the thermostat 10 is not connected to a Wi-Fi network and the thermostat receives the baseline runtimes via the Wi-Fi network from a remote device. The network symbol with an exclamation point may indicate that the energy savings feature of the thermostat 10 does not have wireless connection.

Figure 20:
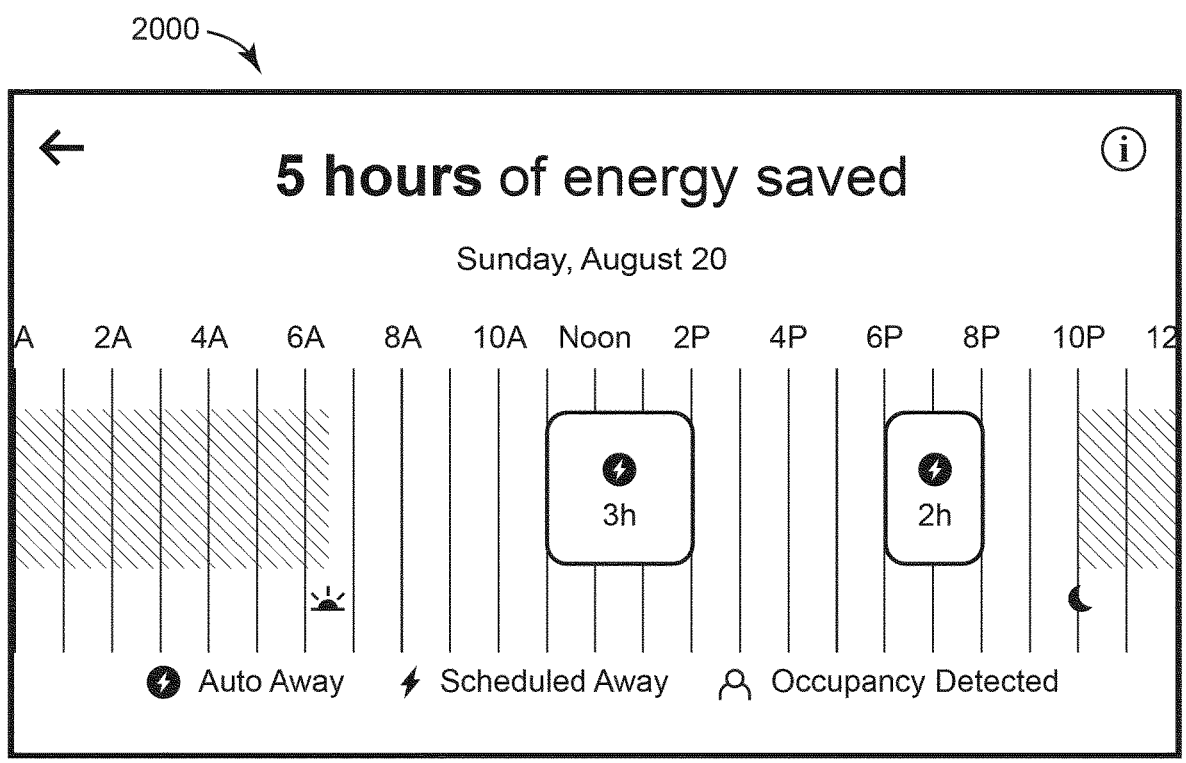
Figure 21:
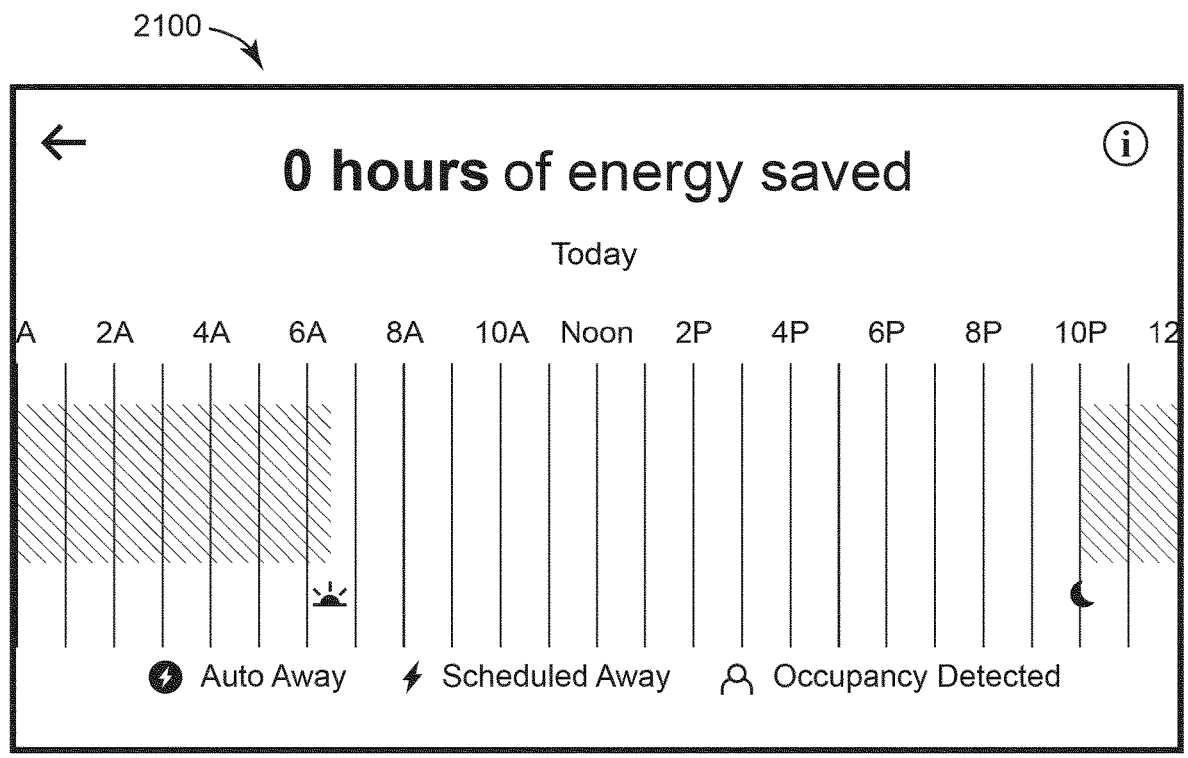

Referring now to FIG. 20, a day view interface 2000 illustrates energy usage where the thermostat 10 does not have Auto Away enabled and there are no scheduled away events. Referring now to FIG. 21, another day view interface 2100 illustrating a day where Auto Away is disabled and there are no scheduled events and/or the thermostat 10 has been running HVAC equipment all day, i.e., no energy has been saved.

Figure 22:
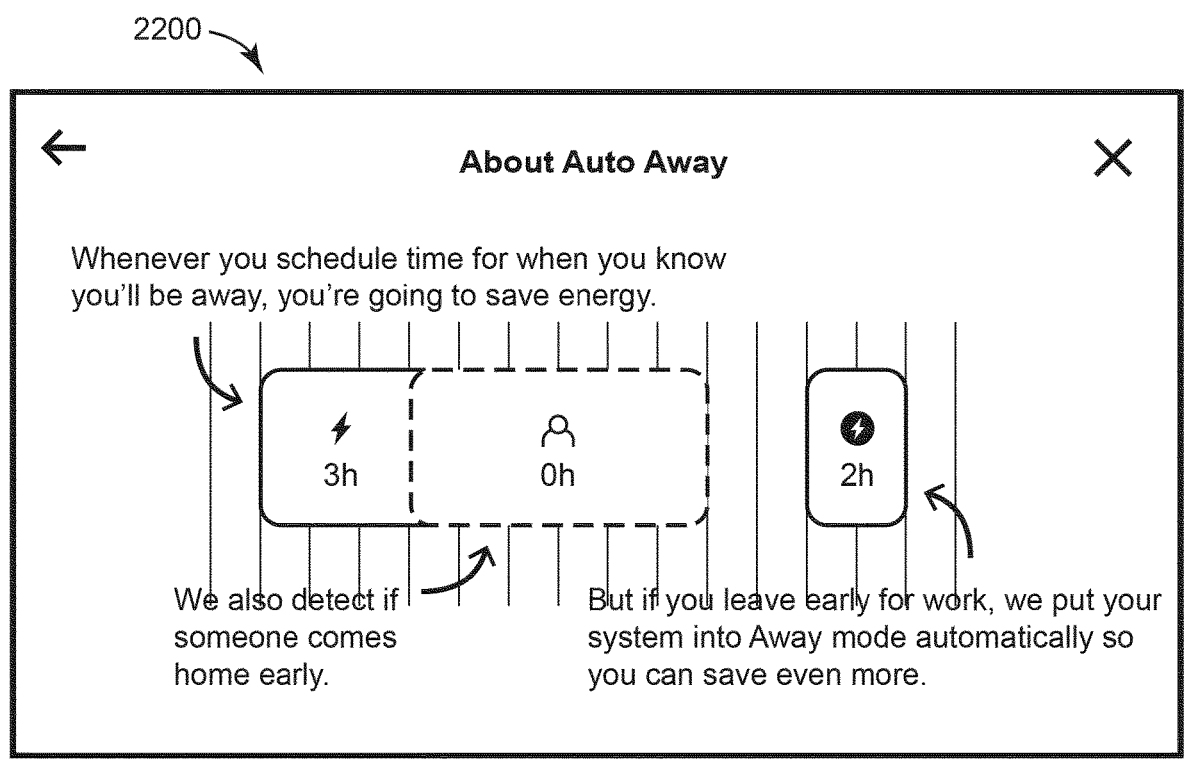

Referring now to FIG. 22, an information interface 2200 is shown informing a user of the auto away feature. The interface 2200 can be navigated to from any day view interface that includes an information button. The interface 2200 explains to a user how the thermostat 10 saves energy and reduces equipment runtimes. The user may be navigated to the interface 2200 if the user presses the information button of interface 2000.

Referring now to FIG. 23, a user interface 2300 is shown for informing a user how energy savings are determine for the thermostat 10. A user may navigate to the interface 2300 by pressing an information icon in one of the week view interfaces. If the user swipes to the left on the interface 2300, the user can be navigated to an interface 2400. Referring now to FIG. 24, the user interface 2400 can provide a user with various tips on increasing the amount of energy saved by the thermostat 10.

Figure 25:
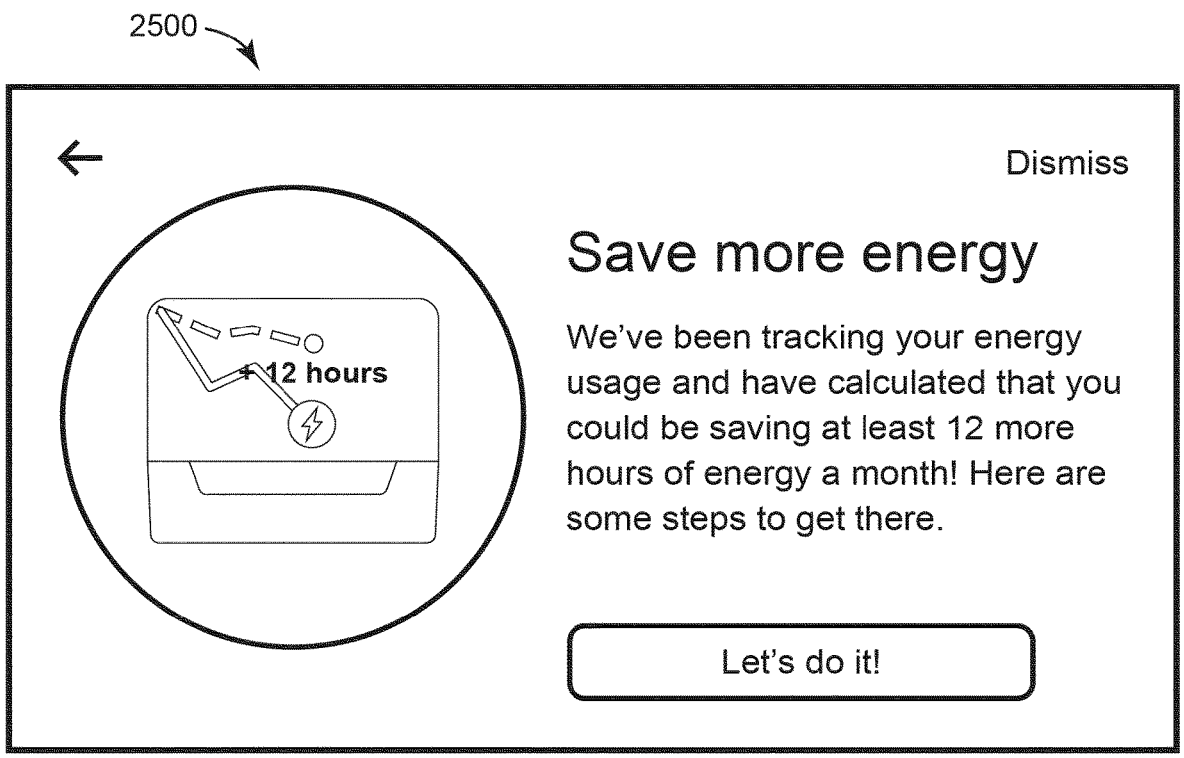

Referring now to FIG. 25, an interface 2500 is shown for notifying a user of low energy savings, according to an exemplary embodiment. If the thermostat 10 determines that the thermostat 10 is not saving at least a predefined amount of energy over a period of a predefined amount of days, i.e., the thermostat 10 has run equipment longer than a predefined amount of time, a notification may appear in the form of the interface 2500 guiding the user through steps to increase their energy savings.

Figure 26:
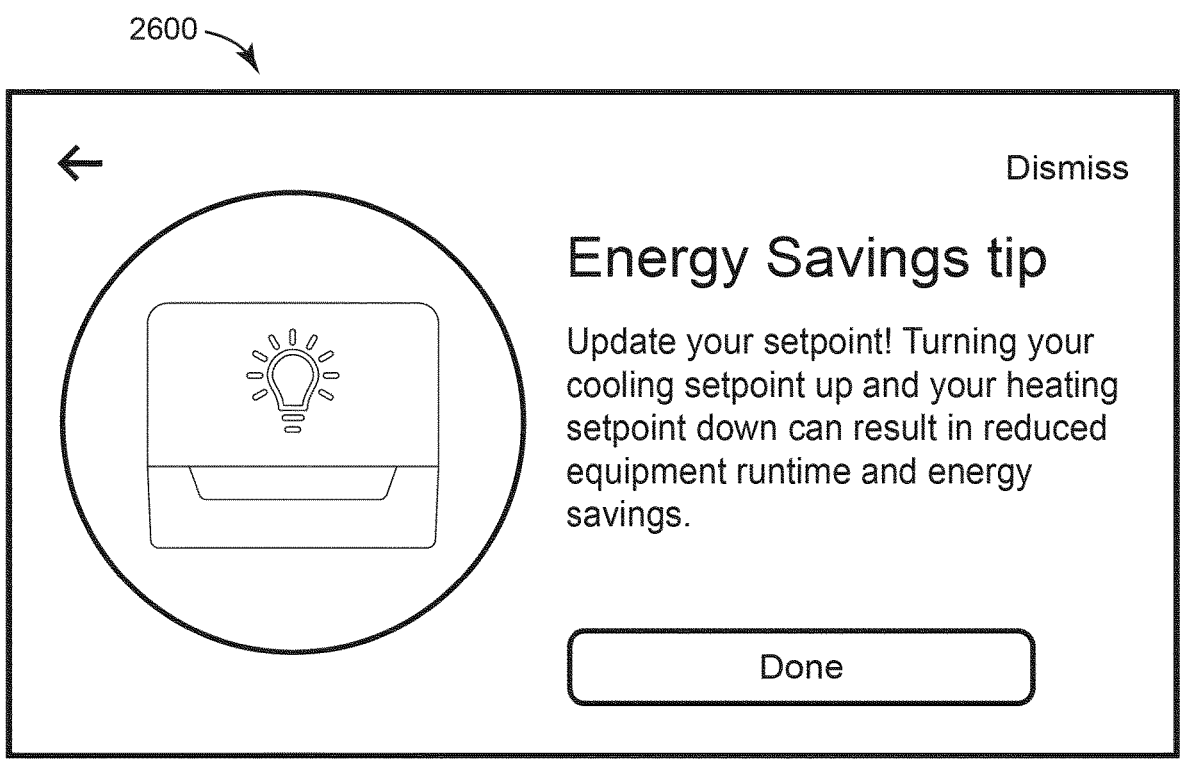

Referring now to FIG. 26, an interface 2600 is shown for providing a user with energy savings tips if their system has run a predefined amount above a threshold amount for a predefined number of days. The notification may inform the user of steps they can take to increase their energy savings.

Figure 27:
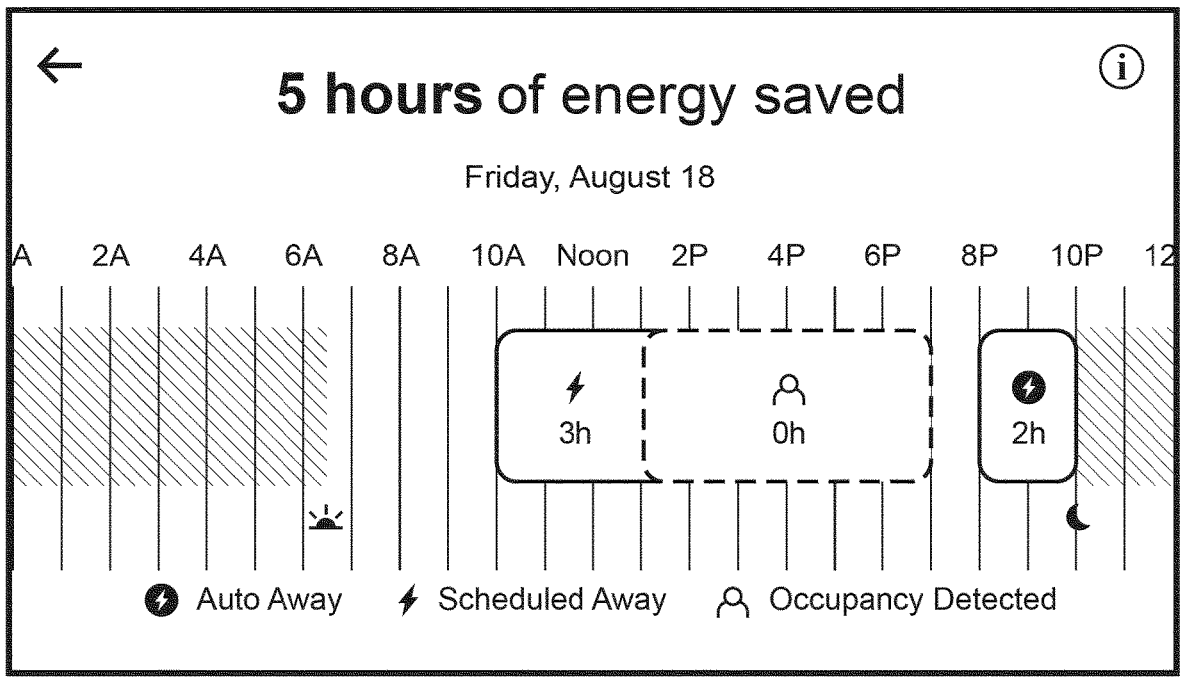

Referring now to FIG. 27, a user interface 2700 is shown illustrating a day view, according to an exemplary embodiment. The day view 2700 illustrates occupancy being detected midway during a scheduled away event. The occupancy detection block appears over the scheduled away event. The hours of energy saved can be updated based on when occupancy is detected. The occupancy block indicates zero hours of energy saved for a portion of the scheduled away event.

Figure 28:
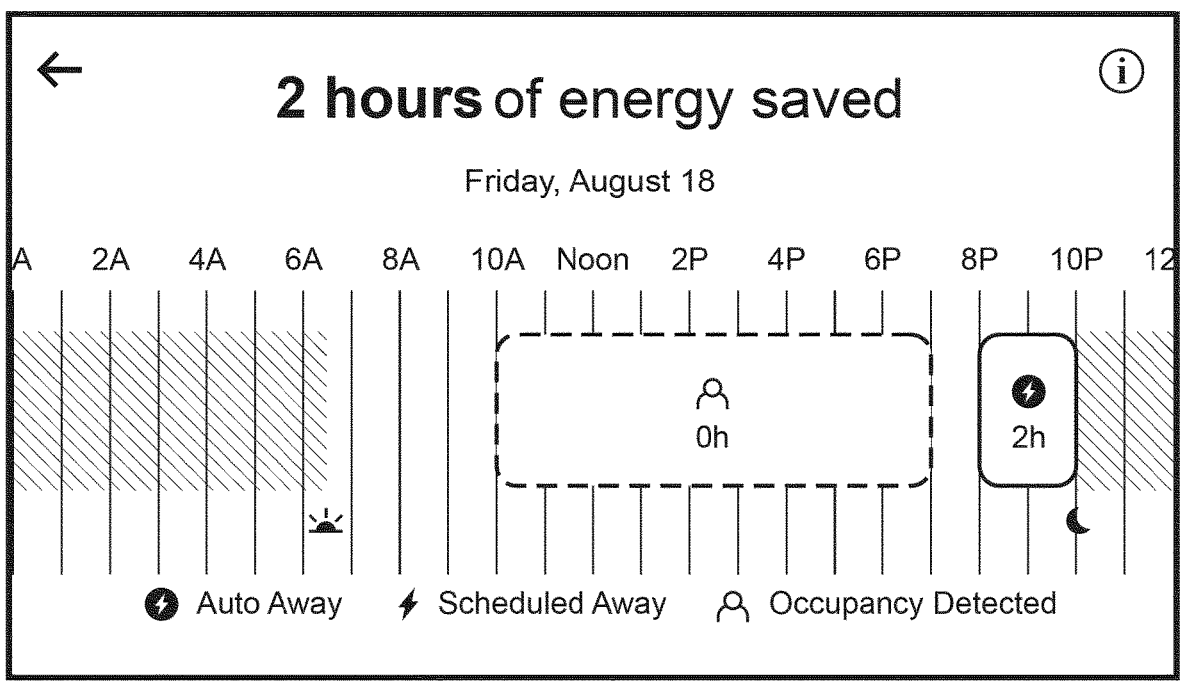

Referring now to FIG. 28, a user interface 2800 is shown illustrating a day view, according to an exemplary embodiment. The day view 2800 illustrates occupancy being detected at the beginning of a scheduled away event. The occupancy detection block shows zero hours of energy saved for the entire scheduled away event.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining energy savings of a thermostat, the method comprising:
   obtaining, by one or more processing circuits of the thermostat, first data indicating an actual length of time that building equipment operated to heat or cool a building space associated with the thermostat;
   identifying, by the one or more processing circuits of the thermostat, a thermal model representative of the building space and the building equipment;
   generating, with least squares, a first set of initial model parameters for the thermal model if the building equipment is configured to heat the building space;
   generating, with least squares, a second set of initial model parameters for the thermal model if the building equipment is configured to cool the building space;
   detecting, by the one or more processing circuits of the thermostat, occupancy in the building space, wherein the thermostat is configured to automatically transition the building equipment to a low energy mode when no users are detected in the building space;
   generating, by the one or more processing circuits of the thermostat and based on the thermal model and the occupancy of the building space, an estimated amount of time that the building equipment would operate to heat or cool the building space at a particular setpoint value; and
   displaying, via a user interface, a graph indicating one or more time periods where occupancy was detected in the building space and an amount of time saved by automatically transitioning the equipment to the low energy mode, wherein the amount of time saved is determined based on the difference between the actual length of time that the building equipment operated and the estimated amount of time.

2. The method of claim 1, further comprising identifying, by the one or more processing circuits, the thermal model from environmental data and control outputs of the thermostat via a stochastic parameter estimation method.

3. The method of claim 2, wherein the method further comprises updating and re-identifying the thermal model based on additional environmental data and additional control outputs of the thermostat collected over a period of time.

4. The method of claim 2, wherein the stochastic parameter estimation method is at least one or a combination of linear least squares, non-linear least squares, a variants least square method, a robust linear least squares method, and a robust non-linear least squares method.

5. The method of claim 1, further comprising:
   generating a set of model parameters for the thermal model based on at least the first set of initial model parameters or the second set of initial model parameters for the thermal model and non-linear least squares.

6. The method of claim 5, wherein generating the set of model parameters for the thermal model comprises iteratively solving for the set of model parameters with non-linear least squares for a predetermined number of iterations or based upon parameter convergence.

7. The method of claim 1, wherein generating, with least squares, the first set of initial model parameters and the second set of initial model parameters comprises:
   modeling a temperature disturbance as a constant value.

8. The method of claim 1, further comprising:
   modeling a temperature disturbance as a polynomial function of time.

9. The method of claim 1, wherein generating, with least squares, the first set of initial model parameters comprises:
   determining a temperature influence of the building equipment configured to heat the building space based on at least one zone temperature (ZNT) value and at least one outdoor air temperature (OAT) value;
   determining some of the first set of model parameters with least squares and the determined temperature influence; and
   determining some of the first set of model parameters based on the minimum difference of a plurality of ZNT values and a plurality of OAT values.

10. The method of claim 1, wherein generating, with least squares, the second set of initial model parameters comprises:
    determining a temperature influence of the building equipment configured to cool the building space based on at least one zone temperature (ZNT) value and at least one outdoor air temperature (OAT) value;
    determining some of the second set of parameters with least squares and the determined temperature influence; and
    determining some of the second set of parameters based on a maximum difference of a plurality of ZNT values and a plurality of OAT values.

11. The method of claim 1, further comprising generating, by the one or more processing circuits, the thermal model for the building space and the building equipment based on recorded outdoor ambient temperature (OAT) values, zone temperature (ZNT) values, states of a one or more heating outputs, and states of a one or more cooling outputs.

12. The method of claim 1, further comprising determining, via a Kalman filter, a temperature disturbance for the thermal model.

13. A thermostat for a building space, the thermostat comprising:
    a processing circuit configured to:
       obtain first data indicating an actual length of time that building equipment is operated to heat or cool a building space associated with the thermostat;
       identify a thermal plant model representative of the building space and the building equipment;
       generate, with least squares, a first set of initial model parameters for the thermal plant model if the building equipment is configured to heat the building space, and a second set of initial model parameters for the thermal plant model if the building equipment is configured to cool the building space;
       detect occupancy in the building space, wherein the thermostat is configured to automatically transition the building equipment to a low energy mode when the building space occupancy is below a threshold;
       generate, based on the thermal plant model and the occupancy of the building space, an estimated amount of time that the building equipment would operate to heat or cool the building space at a particular setpoint value; and
       display, via a user interface, a graph indicating one or more time periods where occupancy was detected in the building space, and indicating an amount of time saved by automatically transitioning the equipment to the low energy mode, wherein the amount of time saved is determined based on the difference between the actual length of time that the building equipment operated and the estimated amount of time.

14. The thermostat of claim 13, wherein the processing circuit is configured to identify the thermal plant model for the building space and the HVAC equipment based on recorded outdoor ambient temperature (OAT) values, zone temperature (ZNT) values, states of a one or more heating outputs, and states of a one or more cooling outputs.

15. The thermostat of claim 13, wherein the processing circuit is configured to determine, via a Kalman filter, a temperature disturbance for the thermal plant model.

16. The thermostat of claim 13, wherein the processing circuit is configured to:
record a plurality of actual runtimes, wherein the actual runtimes are lengths of time that the processing circuit causes the HVAC equipment to heat or cool the building for a plurality of days; and
simulate the thermal plant model to determine a plurality of simulated runtimes for the plurality of days, wherein the thermal plant model is a thermal plant model of the building space and the HVAC equipment.

17. The thermostat of claim 13, wherein the graph displays periods of time where the building equipment is operating on a timeline.

18. The thermostat of claim 17, wherein the graph includes one or more graphical icons that indicate periods of occupancy and the threshold is one user is present in the building space.

19. A system for determining energy usage of a thermostat for a building space, the system comprising:
a processing circuit configured to:
cause building equipment to operate to heat or cool the building space via one or more heating outputs or one or more cooling outputs, wherein an amount of time that the building equipment operates is recorded by the thermostat;
generate, with least squares, a first set of initial model parameters for a thermal plant model if the building equipment is configured to heat the building space, and a second set of initial model parameters for the thermal plant model if the building equipment is configured to cool the building space;
detect, while the building equipment is operating, occupancy in the building space, wherein the thermostat is configured to automatically transition the building equipment to a low energy mode in response to the occupancy;
generate a simulated runtime for the building equipment based on the thermal plant model, the simulated runtime indicate an estimate amount of time that the building equipment would operate to heat or cool the building space according to a setpoint, wherein the thermal plant model is a thermal model of the building space and the building equipment; and
display, via a user interface, a graph indicating one or more time periods where occupancy was detected in the building space and an amount of time saved by automatically transitioning the equipment to the low energy mode, wherein the amount of time saved is determined based on the difference between the recorded length of time that the building equipment is operated and the simulated runtime.

20. The system of claim 19, wherein the system further comprises a remote device comprising a processing circuit, wherein the processing circuit of the remote device is configured to:
receive, via a network, data indicating one or more heating outputs, one or more cooling outputs, and a zone temperature from the thermostat;
determine the simulated runtime by:
generating the thermal plant model for the building space and the HVAC equipment based on at least one ambient temperature (OAT) value, the at least one received zone temperature (ZNT) values, the one or more heating outputs, and the one or more cooling outputs; and
simulating the thermal plant model to determine the simulated runtime.

* * * * *